(12) United States Patent
Marchand et al.

(10) Patent No.: US 8,362,184 B2
(45) Date of Patent: *Jan. 29, 2013

(54) BUTENE/α-OLEFIN BLOCK INTERPOLYMERS

(75) Inventors: Gary R. Marchand, Lake Jackson, TX (US); Yunwa W. Cheung, Hillsborough, NJ (US); Benjamin C. Poon, Pearland, TX (US); Jeffrey D. Weinhold, Lake Jackson, TX (US); Kim L. Walton, Lake Jackson, TX (US); Pankaj Gupta, Midland, MI (US); Colin Li Pi Shan, Pearland, TX (US); Phillip D. Hustad, Manvel, TX (US); Roger L. Kuhlman, Lake Jackon, TX (US); Edmund M. Carnahan, Fresno, TX (US); Eddy I. Garcia-Meitin, Angleton, TX (US); Patricia L. Roberts, Pearland, TX (US)

(73) Assignee: DOW Global Technologies, LLC, Midland, MI (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/864,433

(22) PCT Filed: Jan. 30, 2009

(86) PCT No.: PCT/US2009/032649
§ 371 (c)(1), (2), (4) Date: Sep. 15, 2010

(87) PCT Pub. No.: WO2009/097535
PCT Pub. Date: Aug. 6, 2009

(65) Prior Publication Data
US 2011/0060103 A1    Mar. 10, 2011

Related U.S. Application Data

(60) Provisional application No. 61/024,705, filed on Jan. 30, 2008.

(51) Int. Cl.
*C08F 210/00*  (2006.01)
*C08F 10/14*   (2006.01)
*C08F 10/04*   (2006.01)
*C08F 10/00*   (2006.01)

(52) U.S. Cl. ............... 526/348; 526/348.2; 526/348.3; 526/348.6; 526/282

(58) Field of Classification Search ........... 526/348, 526/348.2, 348.3, 348.6, 282
See application file for complete search history.

(56) References Cited

U.S. PATENT DOCUMENTS

| | | | |
|---|---|---|---|
| 7,947,793 B2 * | 5/2011 | Marchand et al. | 526/281 |
| 8,106,139 B2 * | 1/2012 | Marchand et al. | 526/348.2 |
| 8,124,709 B2 * | 2/2012 | Marchand et al. | 359/586 |
| 2007/0219334 A1 * | 9/2007 | Li Pi Shan et al. | 526/348 |
| 2010/0113698 A1 * | 5/2010 | Walton et al. | 525/88 |
| 2011/0015363 A1 * | 1/2011 | Marchand et al. | 526/336 |
| 2011/0054121 A1 * | 3/2011 | Marchand et al. | 525/89 |

* cited by examiner

*Primary Examiner* — William Cheung

(57) ABSTRACT

Embodiments of the invention provide a class of mesophase separated butene/α-olefin block interpolymers with controlled block sequences. The butene/α-olefin interpolymers are characterized by an average block index, ABI, which is greater than zero and up to about 1.0 and a molecular weight distribution, $M_w/M_n$, greater than about 1.4. Preferably, the block index is from about 0.2 to about 1. In addition or alternatively, the block butene/α-olefin interpolymer is characterized by having at least one fraction obtained by Temperature Rising Elution Fractionation ('TREF'), wherein the fraction has a block index greater than about 0.3 and up to about 1.0 and the butene/α-olefin interpolymer has a molecular weight distribution, $M_w/M_n$, greater than about 1.4.

28 Claims, 1 Drawing Sheet

Schematic for synthesis of the inventive block interpolymers.

BUTENE/α-OLEFIN BLOCK INTERPOLYMERS

CROSS-REFERENCE TO RELATED APPLICATIONS

This application claims priority from U.S. Provisional Application Ser. No. 61/024,705 filed Jan. 30, 2008. This application is also related to the following U.S. Provisional Patent Applications also filed Jan. 30, 2008 with Ser. Nos. 61/024,688 ; 61/024,693 ; 61/024,698 ; 61/024,701 , and 61/024,674 . For purposes of United States patent practice, the contents of these applications are herein incorporated by reference in their entirety.

FIELD OF THE INVENTION

This invention relates to mesophase separated compositions of butene/α-olefin block interpolymers with controlled block sequences and articles made from the block interpolymers.

BACKGROUND OF THE INVENTION

Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers can be either linear multi-block, multi-block star polymers (in which all blocks bond to the same atom or chemical moiety) or comb-like polymers where the B blocks are attached at one end to an A backbone.

A block copolymer is created when two or more polymer molecules of different chemical composition are covalently bonded to each other. While a wide variety of block copolymer architectures are possible, a number of block copolymers involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers, are also possible and may have commercial importance.

One method to make block copolymers is to produce a "living polymer". Unlike typical Ziegler-Natta polymerization processes, living polymerization processes involve only initiation and propagation steps and essentially lack chain terminating side reactions. This permits the synthesis of pre-determined and well-controlled structures desired in a block copolymer. A polymer created in a "living" system can have a narrow or extremely narrow distribution of molecular weight and be essentially monodisperse (i.e., the molecular weight distribution is essentially one). Living catalyst systems are characterized by an initiation rate which is on the order of or exceeds the propagation rate, and the absence of termination or transfer reactions. In addition, these catalyst systems are characterized by the presence of a single type of active site. To produce a high yield of block copolymer in a polymerization process, such catalysts must exhibit living characteristics to a substantial extent.

Butadiene-isoprene block copolymers have been synthesized via anionic polymerization using the sequential monomer addition technique. In sequential addition, a certain amount of one of the monomers is contacted with the catalyst. Once a first such monomer has reacted to substantial extinction forming the first block, a certain amount of the second monomer or monomer species is introduced and allowed to react to form the second block. The process may be repeated using the same or other anionically polymerizable monomers. However, propylene and other α-olefins, such as propylene, butene, 1-octene, etc., are not directly block polymerizable by anionic techniques.

Whenever crystallization occurs under quiescent conditions, which means that the polymer is not subjected to either external mechanical forces or unusually fast cooling, homopolymers made from a highly crystallizable monomer will crystallize from a melt and form spherical structures called "spherulites". These spherulites range in size from micrometers to millimeters in diameter. A description of this phenomenon may be found in Woodward, A. E., *Atlas of Polymer Morphology*, Hanser Publishers, New York, 1988. The spherulites are composed of layer like crystallites called lamellae. Descriptions of this may be found in Keller, A., Sawada, S. *Makromol. Chem.,* 74, 190 (1964) and Basset, D. C., Hodge, A. M., Olley, R. H., *Proc. Roy. Soc. London*, A377, p 25, 39, 61 (1981). The spherulitic structure starts from a core of parallel lamellae that subsequently branch and grow outward from the core in a radial direction. Disordered polymeric chains make up the material between lamellar branches as described in Li, L., Chan, C., Yeung, K. L., Li, J., Ng, K., Lei, Y., *Macromolecules,* 34, 316 (2001).

Polyethylene and random α-olefin copolymers of ethylene can be forced to assume non-spherulitic morphologies in certain cases. One situation occurs when the crystallization conditions are not quiescent, such as during blown or cast film processing. In both cases, the melts are subjected to strong external forces and fast cooling, which usually produce row-nucleated or "shish-kebab" structures as described in A. Keller, M. J. Machin, *J. Macromol. Sci. Phys.,* 1, 41 (1967). A non-spherulitic morphology will also be obtained when the molecules contain enough of an α-olefin or another type of comonomer to prevent the formation of lamellae. This change in crystal type occurs because the comonomers are usually too bulky to pack within an ethylene crystal and, therefore, a sequence of ethylene units in between comonomers cannot form a crystal any thicker than the length of that sequence in an all-trans conformation. Eventually, the lamellae would have to become so thin that chain folding into lamellar structures is no longer favorable. In this case, fringed micellar or bundled crystals are observed as described in S. Bensason, J. Minick, A. Moet, S. Chum, A. Hiltner, E. Baer, *J. Polym. Sci. B: Polym. Phys.,* 34, 1301 (1996). Studies of low molecular weight polyethylene fractions provide an understanding of the number of consecutive ethylene units that are required to form a chain folded lamellae. As described in L. Mandelkern, A. Prasad, R. G. Alamo, G. M. Stack, *Macromolecules,* 23, 3696 (1990) polymer chain segments of at least 100 ethylene units are required for chain folding. Below this number of ethylene units, low molecular weight fractions form extended chain crystals while polyethylene at typical molecular weights form fringed micelles and create a granular type morphology.

A fourth type of solid state polymer morphology has been observed in α-olefin block copolymers made by batch anionic polymerization of butadiene followed by hydrogenation of the resulting polymer. At the crystallization temperature of the ethylene segments, the amorphous blocks can be either glassy or elastic. Studies of crystallization within a glassy matrix have used styrene-ethylene (S-E) diblocks as described in Cohen, R. E., Cheng, P. L., Douzinas, K., Kofinas, P., Berney, C. V., *Macro-* molecules, 23, 324 (1990) and ethylene-vinylcyclohexane (E-VCH) diblocks as described in Loo, Y. L., Register, R. A., Ryan, A. J., Dee G. T., *Macromolecules* 34, 8968 (2001). Crystallization within an elastic matrix has been studied using ethylene-(3-methyl-butene) diblocks as described in Quiram, D. J., Register, R. A., Marchand, G. R., Ryan, A. J., *Macromolecules* 30, 8338 (1997) and using ethylene-(styrene-ethylene-butene) diblocks as described in Loo, Y. L., Register, R. A., Ryan, A. J., *Macromolecules* 35, 2365 (2002). When the matrix was either glassy was elastic but with a high degree of segregation between the blocks, the solid state structure showed the classical morphology of amorphous block copolymers such as styrene-butadiene-styrene (SBS), in which the different polymer segments were constrained into microdomains of approximately 25 nm in diameter. Crystallization of the ethylene segments in these systems was primarily constrained to the resulting microdomains. Microdomains can take the form of spheres, cylinders, or lamellae. The narrowest dimension of a microdomain, such as perpendicular to the plane of lamellae, is constrained to <60 nm in these systems. It is more typical to find constraints on the diameter of the spheres and cylinders, and the thickness of the lamellae to <30 nm. Such materials may be referred to as microphase separated. FIG. 1 shows the predicted lamellar domain thickness for monodisperse butene/ethylene diblock copolymers at different values of total molecular weight and $\Delta$ ethylene mole %. The figure demonstrates that, even at very large differences in ethylene content of the blocks, molecular weights in excess of 450,000 g/mol are necessary to achieve domain sizes of 50 nm. The high viscosity which is unavoidable at such high molecular weights greatly complicates the production and processing of these materials. The calculation applied the theoretical results of Matsen, M. W.; Bates, F. S. *Macromolecules* (1996) 29, 1091 at a temperature of 140° C., a characteristic ratio of 6.1, and a melt density of 0.78 g/cm³. The correlation between ethylene mole % and $\chi$ was determined using the experimental results of D. J. Lohse, W. W. Graessley, *Polymer Blends Volume 1: Formulation*, ed. D. R. Paul, C. B. Bucknall, 2000.

Block copolymers containing both crystalline and amorphous blocks can crystallize from disordered, rather than microphase separated, melts and produce a regular arrangement of crystalline lamellae as described in Rangarajan, P., Register, R. A., Fetters, L. J. *Macromolecules,* 26, 4640 (1993). The lamellar thickness of these materials is controlled by the composition and molecular weight of both blocks as described in theories by Dimarzio, E. A., Guttmann, C. M., Hoffman, J. D., *Macromolecules,* 13, 1194 and Whitmore, M. D., Noolandi, J., *Macromolecules,* 21, 1482 (1988). For an ethylene based block copolymer, the maximum thickness of the crystalline region of these morphologies is the same as the maximum thickness of a high density polyethylene crystal which is about 22 nm.

Block copolymers from olefin monomers prepared using living polymerization catalysts were recently reviewed by Domski, G. J.; Rose, J. M.; Coates, G. W.; Bolig, A. D.; Brookhart, M., in *Prog. Polym. Sci.* 32, 30-92, (2007). Some of these monodisperse block copolymers also showed the classical morphology of amorphous block copolymers such as styrene-butadiene-styrene (SBS). Several of these block copolymers contain crystallizable segments or blocks, and crystallization of the segments in these systems was primarily constrained to the resulting microdomains. Syndiotactic polypropylene-block-poly(ethylene-co-propylene) and syndiotactic polypropylene-block-polyethylene, as described in Ruokolainen, J., Mezzenga, R., Fredrickson, G. H., Kramer, E. J., Hustad, P. D., and Coates, G. W., in *Macromolecules,* 38(3); 851-86023 (2005), form microphase separated morphologies with domain sizes consistent with monodisperse block copolymers (<60 nm). Similarly, polyethylene-block-poly(ethylene-co-propylene)s, as described by Matsugi, T.; Matsui, S.; Kojoh, S.; Takagi, Y.; Inoue, Y.; Nakano, T.; Fujita, T.; Kashiwa, N. in *Macromolecules,* 35(13); 4880-4887 (2002), are described as having microphase separated morphologies. Atactic polypropylene-block-poly(ethylene-co-propylene)s with narrow molecular weight distributions (Mw/Mn=1.07–1.3), as described in Fukui Y, Murata M. *Appl. Catal. A* 237, 1-10 (2002), are claimed to form microphase separated morphologies when blended with isotactic polypropylenes, with domains of amorphous poly(ethylene-co-propylene) between 50-100 nm. No microphase separation was observed in the bulk block copolymer.

Microphase separated diblock and triblock olefin block copolymers in which both block types are amorphous have also been prepared using living olefin polymerization techniques. A triblock poly(1-hexene)-block-poly(methylene-1, 3-cyclopentane)-block-poly(1-hexene) copolymer, as described by Jayaratne K. C., Keaton R. J., Henningsen D. A., Sita L. R., *J. Am. Chem. Soc.* 122, 10490-10491 (2000), with Mn=30,900 g/mol and Mw/Mn=1.10 displayed a microphase separated morphology with cylinders of poly(methyene-1,3-cyclopentane) sized about 8 nm wide. Poly(methylene-1,3-cyclopentane-co-vinyltetramethylene)-block-poly(ethylene-co-norbornene) and poly(ethylene-co-propylene)-block-poly(ethylene-co-norbornene), as described by Yoon, J.; Mathers, R. T.; Coates, G. W.; Thomas, E. L. in *Macromolecules,* 39(5), 1913-1919 (2006), also display microphase separated morphologies. The poly(methylene-1,3-cyclopentane-co-vinyltetramethylene)-block-poly(ethylene-co-norbornene), with Mn=450,000 g/mol and Mw/Mn=1.41, has alternating domains of 68 and 102 nm, while the poly(ethylene-co-propylene)-block-poly(ethylene-co-norbornene), with Mn=576, 000 g/mol and Mw/Mn=1.13, has domains sized 35-56 nm. These samples demonstrate the difficulty in achieving domain sizes >60 nm, as very high molecular weights are required to achieve such large domains.

These materials based on batch anionic polymerization or living olefin polymerization can be additionally characterized as having very narrow molecular weight distributions, typically with Mw/Mn<1.4, more typically with Mw/Mn<1.2, and correspondingly narrow molecular weight distributions of their individual segments. They have also only been examined in the form of diblock and triblock copolymers since these are more readily synthesized via living anionic polymerization than structures with higher numbers of blocks.

Achieving microphase separated block copolymer morphologies usually requires unfavorable dispersive interactions between the segments of the different blocks, as characterized by the Flory-Huggins $\chi$ parameter, and high molecular weights. Representing the average block molecular weight as N, a typical narrow polydispersity diblock containing equal amounts by volume of the two blocks requires a value of $\chi$ times N greater than 5.25 for the melt to display an ordered microphase morphology as shown by L. Leibler, *Macromolecules* 13, 1602 (1980). This minimum value of $\chi$N to achieve order increases to about 6 for triblock copolymers with equal volumes of the two block types. As the number of blocks per molecule increases further, the required $\chi$N also increases and asymptotically approaches 7.55 in the limit of a large number of blocks per molecule as shown by T. A.

Kavassalis, M. D. Whitmore, *Macromolecules* 24, 5340 (1991). Although multiblocks such as pentablocks have been shown to provide a substantial improvement in mechanical properties as described in T. J. Hermel, S. F. Hahn, K. A. Chaffin, W. W. Gerberich, F. S. Bates, *Macromolecules* 36, 2190 (2003), the overall molecular weight of these multiblocks has to be large in order to meet the requirements for ordered melt morphologies. Since the energy requirements to process a polymer increases sharply with molecular weight, the commercial opportunities of such multiblocks may be limited.

However, theoretical studies by S. W. Sides, G. H. Fredrickson, J. Chem. Phys. 121, 4974 (2004) and D. M. Cooke, A. Shi, *Macromolecules* 39, 6661 (2006) have shown that the minimum χN for ordered morphologies decreases as the polydispersity of one or both of the block types is increased. When both block types have a most probable distribution of length, i.e. the ratio of weight average to number average block molecular weight is 2, the minimum value of χN, where N is the number average block length, in order to achieve an ordered morphology is 2 for equal volumes of the two block types as shown by I. I. Potemkin, S. V. Panyukov, *Phys. Rev. E.* 57, 6902 (1998) for multiblocks in the mean-field limit. This lower value in χN translates to a substantial reduction in overall molecular weight for a melt ordered multiblock and, therefore, a drop in processing costs.

Another important prediction made by Potemkin, Panyukov and also by Matsen, M. W., *Phys. Rev. Lett.* 99, 148304 (2007) is that each transition in morphology, including the transition from disorder to order, does not occur abruptly as in monodisperse block copolymers. Instead, there are regions of coexisting phases along each boundary. Along the order-order boundaries, the overall composition of a molecule may determine how it partitions between phases. For example, polydisperse diblocks along the boundary between cylindrical and lamellar phases may have the more symmetric diblocks form lamellae while the asymmetric ones will tend to form cylinders. In the vicinity of the order-disorder boundary, molecules with longer blocks may form an ordered morphology while those with shorter blocks remain disordered. In some cases, these disordered molecules may form a distinct macrophase. Alternatively, the location of these molecules could be directed to the center of the ordered domains in a similar manner to the domain swelling that occurs when a homopolymer is blended with a block copolymer (Matsen, M. W., *Macromolecules* 28, 5765 (1995)).

In addition to achieving microphase separation at lower values of χN, block length polydispersity has also been hypothesized to have a pronounced effect on the domain size of the ordered structures. The size of the microdomains in monodisperse block copolymers is largely a function of the average molecular weight of a block, N, and is typically on the order of ~20-50 nm. However, it has been predicted that polydispersity leads to larger domain sizes as compared with equivalent monodisperse block copolymers (Cooke, D. M.; Shi, A. C. *Macromolecules* (2006), 39, 6661-6671; Matsen, M. W., *Eur. Phys. J. E* (2006), 21, 199-207). The effects of polydispersity on phase behavior have also been demonstrated experimentally. Matsushita and coworkers approximated polydispersity by blending a series of monodisperse polystyrene-b-poly(2-vinylpyridine)s (Noro, A.; Cho, D.; Takano, A.; Matsushita, Y. *Macromolecules* (20050, 38, 4371-4376). Register and coworkers found ordered morphologies in a series of polystyrene-b-poly(acrylic acid)s synthesized using a controlled radical polymerization technique (Bendejacq, D.; Ponsinet, V.; Joanicot, M.; Loo, Y. L.; Register, R. A. *Macromolecules* 2002, 35, 6645-6649). Most recently, Lynd and Hillmyer (Lynd, N. A.; Hillmyer, M. A. *Macromolecules* 2005, 38, 8803-8810) evaluated a series of monodisperse poly(ethylene-alt-propylene)s that were chain extended with a block of poly(DL-lactide) using synthetic techniques that introduced polydispersity in the poly(DL-lactide) block. In all of these examples polydispersity led to increased domain spacings, suggesting that the longer blocks have a greater role in determining domain size. In some instances, polydispersity also produced changes in the type of ordered morphology. The range of techniques for synthesis of polydisperse block copolymers is extremely limited, and it is especially difficult to introduce polydispersity in multiple blocks while maintaining a high fraction of block copolymer.

It would be useful to provide an olefin block copolymer with an overall molecular weight distribution and segment molecular weight distribution such that Mw/Mn>1.4, that is mesophase separated. It would be useful to provide such a material with two, three, or more blocks per chain.

In addition, there is an unfulfilled need for mesophase separated block copolymers which are based on butene and α-olefins. There is also a need for block copolymers with low molecular weights (Mw<200,000 g/mol) that form domains larger than those from monodisperse block copolymers of the prior art, namely greater than 60 nm in the smallest dimension. There is also a need for a method of making such block copolymers.

SUMMARY OF THE INVENTION

The invention provides a composition comprising at least one butene/α-olefin interpolymer comprising two or more substantially homogeneous intramolecular blocks comprising differing chemical or physical properties and having a difference in mole percent α-olefin content, said intramolecular blocks characterized by possessing a most probable molecular weight distribution, wherein the ethylene/α-olefin block interpolymer is characterized by a molecular weight distribution, $M_w/M_n$, in the range of from about 1.4 to about 2.8 and by an average block index greater than zero and up to about 1.0; and, wherein the butene/α-olefin block interpolymer is mesophase separated.

In addition, the invention provides a butene/α-olefin block copolymer wherein the copolymer is characterized by an average molecular weight of greater than 40,000 g/mol, a molecular weight distribution, Mw/Mn, in the range of from about 1.4 to about 2.8, and a difference in mole percent α-olefin content between the soft block and the hard block of greater than about 20 mole percent.

The invention also provides an article made from the above described butene/α-olefin block copolymer.

According to the present invention there is also provided a process for the polymerization of one or more addition polymerizable monomers, preferably of two or more addition polymerizable monomers, especially butene and at least one copolymerizable comonomer, to form a block copolymer comprising multiple blocks or segments of differentiated polymer composition or properties, especially blocks or segments comprising differing comonomer incorporation levels in which the difference in comonomer content between the blocks or segments is greater than 20 mol %, said process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

DESCRIPTION OF EMBODIMENTS OF THE INVENTION

General Definitions

Figure 1:
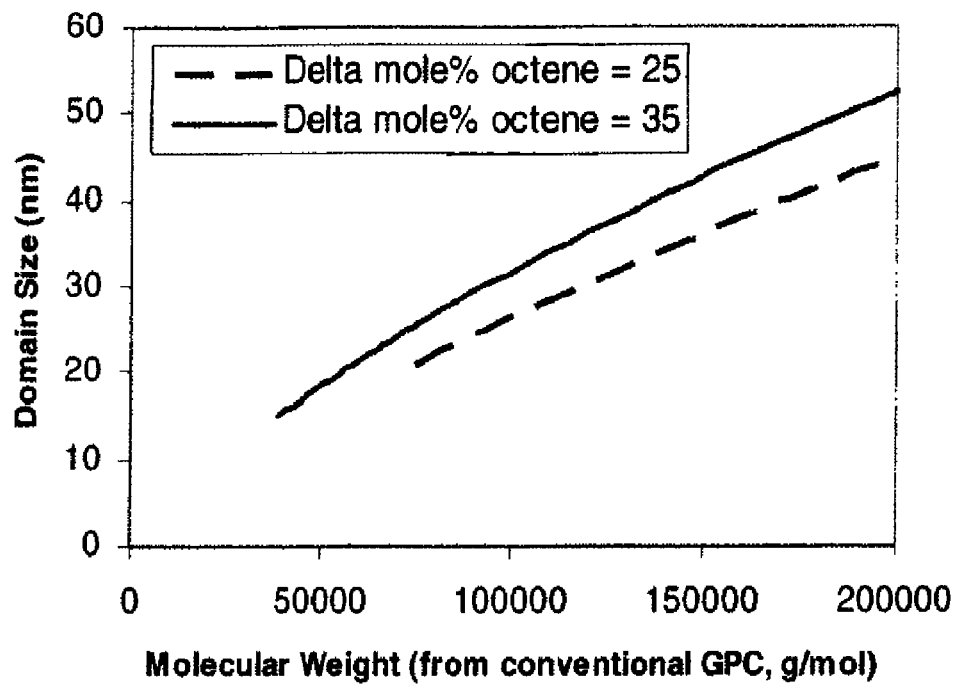
FIG. 1 is a plot of the predicted thickness of each domain for a monodisperse ethylene/octene diblock copolymer made with 50% of each block type at different values of the backbone molecular weight, as measured by conventional GPC, and different levels of Δ octene mole %.

"Polymer" means a polymeric compound prepared by polymerizing monomers, whether of the same or a different type. The generic term "polymer" embraces the terms "homopolymer," "copolymer," "terpolymer" as well as "interpolymer." More specifically, the term "polyethylene" includes homopolymers of ethylene and copolymers of ethylene and one or more $C_{3-8}$ α-olefins.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The crystals may exist as stacks of closely packed lamellar crystals, lamellae forming the arms of spherulites, or as isolated lamellar or fringed micellar crystals. The term "amorphous" refers to a polymer lacking a crystalline melting point as determined by differential scanning calorimetry (DSC) or equivalent technique. The term "elastomer" refers to a polymer or polymer segment having Tg less than 0° C., more preferably less than −15° C., most preferably less than −25° C.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "butene/α-olefin interpolymer" generally refers to polymers comprising butene and an α-olefin having 2, 3, 5 or more carbon atoms. Preferably, butene comprises the majority mole fraction of the whole polymer, i.e., butene comprises at least about 50 mole percent of the whole polymer. More preferably, butene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many butene/octene copolymers, the preferred composition comprises a butene content greater than about 75 mole percent of the whole polymer and an octene content of from about 5 to about 25, preferably from about 10 to about 20 mole percent of the whole polymer, and more preferably from about 15 to about 20 mole percent of the whole polymer. For many butene/butene copolymers, the preferred composition comprises a butene content greater than about 60 mole percent of the whole polymer and a butene content of from about 10 to about 40, preferably from about 20 to about 35 mole percent of the whole polymer, and more preferably from about 25 to about 30 mole percent of the whole polymer. For many butene/ethylene copolymers, the preferred composition comprises a butene content greater than about 40 mole percent of the whole polymer and an ethylene content of from about 15 to about 60, preferably from about 25 to about 50 mole percent of the whole polymer, and more preferably from about 35 to about 45 mole percent of the whole polymer. In some embodiments, the butene/α-olefin interpolymers do not include those produced in low yields or in a minor amount or as a by-product of a chemical process. While the butene/α-olefin interpolymers can be blended with one or more polymers, the as-produced butene/α-olefin interpolymers are substantially pure and often comprise a major component of the reaction product of a polymerization process.

The term "block copolymer" or "segmented copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion.

Embodiments of the invention provide a new class of butene/α-olefin block interpolymers (hereinafter "inventive polymer", "butene/α-olefin interpolymers", or variations thereof). The butene/α-olefin interpolymers comprise butene and one or more copolymerizable α-olefin comonomers in polymerized form, characterized by blocks or segments of two or more polymerized monomer units differing in chemical or physical properties, wherein the polymers are mesophase separated. That is, the butene/α-olefin interpolymers are block interpolymers. The terms "interpolymer" and "copolymer" are used interchangeably herein.

Compared to random copolymers, the inventive polymers possess sufficient differences in chemical properties, especially crystallinity, between blocks or segments, and sufficient block length to the respective blocks to achieve one or more of the desired properties of true block copolymers, such as thermoplastic/elastomeric properties, while at the same time being amenable to preparation in conventional olefin polymerization processes, especially continuous solution polymerization processes employing catalytic quantities of polymerization catalysts. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both overall polydispersity index (PDI or $M_w/M_n$) and PDI of each block, block length distribution, and/or block number distribution due to the unique process making of the copolymers.

Compared to block copolymers of the prior art, including copolymers produced by sequential monomer addition, fluxional catalysts, or anionic polymerization techniques, the copolymers of the invention are characterized by unique distributions of polymer polydispersity (PDI or Mw/Mn) and block length distribution, with two or three, preferably two different block compositions. This is due, in a preferred embodiment, to the effect of the use of one or more shuttling agents in combination with a high activity metal complex based polymerization catalyst in two or more polymerization reactors or zones operating under differing polymerization conditions. More specifically, when produced in a continuous process, the diblock copolymers desirably possess PDI from about 1.4 to about 8, preferably from about 1.4 to about 3.5, more preferably from about 1.5 to about 2.5, and most preferably from about 1.6 to about 2.5 or from about 1.6 to about 2.1.

The respective blocks of the inventive block interpolymer desirably possess a PDI fitting a Schulz-Flory distribution rather than a Poisson distribution. The use of the present polymerization process results in a product having a number of distinguishable blocks per polymer equal to the number of reactors or distinct reaction zones employed in the process, with a polydisperse distribution of block sizes. This results in the formation of polymer products having improved and distinguishable physical properties. Moreover, the foregoing novel products may be formed in the presence of random copolymer or homopolymer formed in one or more of the associated polymerization processes due to early or intentional chain termination without chain transfer to the chain shuttling agent (CSA). In this manner, a polymer blend containing in situ prepared rubbery impact modifier or compatibilizer may be prepared in two or more polymerization reactors or zones operating in series.

It may be readily appreciated by the skilled artisan that in one embodiment of the present invented process the CSA may be added once, more than once (intermittently) or added continuously to each polymerization reactor or zone, preferably the initial one. Although the CSA may be added at a point immediately prior to discharge from the first reactor or zone, or even in an intervening conduit or conductor connecting the respective reactors or zones, it is preferable that the CSA be added to the reaction mixture prior to initiation of polymerization, at the same time as polymerization is initiated, or at least during a significant portion of the time in which polymerization is conducted in the first reactor. Thorough mixing of CSA and reaction mixture may be occasioned by active or static mixing devices or by use of any stirring or pumping device employed in mixing or transferring the reaction mixture.

The tendency for longer block lengths to have a greater role in determining domain size, combined with the ability to swell domains, creates the potential for domain sizes that are much larger than what is observed in typical monodisperse block copolymers. The ability for some molecules to be ordered and others disordered contributes to the formation of swollen domains.

As used herein, "mesophase separation" means a process in which polymeric blocks are locally segregated to form ordered domains. Crystallization of the butene segments in these systems is primarily constrained to the resulting mesodomains and such systems may be referred to as "mesophase separated". These mesodomains can take the form of spheres, cylinders, lamellae, or other morphologies known for block copolymers.

The inventive butene/α-olefin block interpolymer may have a value of $\chi N$, where N is the number average block length, and preferably is in the range of from about 2 to about 20, preferably in the range of from about 2.5 to about 15, and more preferably in the range of from about 3 to about 10.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

In some embodiments, the block copolymer can be represented by the following formula:

A-B or A-B-A where "A" represents a hard block or segment and "B" represents a soft block or segment. Preferably, As and Bs are linked in a linear fashion, not in a branched or a star fashion.

Other embodiments of the invention can be represented by the following formula:

A-[(BA)$_n$] or A-[(BA)$_n$B]

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. Further embodiments of the invention can be represented by the following formula:

A-(AB)$_n$-A or A-(AB)$_n$-B or B-(AB)$_n$-B where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

In other embodiments, the block copolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

In other embodiments, the block copolymers do have a third type of block or segment and can be represented by the following formula:

A-B-C where "A" represents a hard block or segment, "B" represents a soft block or segment, and "C" represents either a hard or soft block or segment. Preferably, As, Bs, and Cs are linked in a linear fashion, not in a branched or a star fashion.

Other embodiments of the invention can be represented by the following formula:

A-(BC)$_n$ or A-(BC)$_n$B or A-(CB)$_n$ or A-(CB)$_n$C where n is at least 1, preferably an integer greater than 1, such as 2, 3, 4, 5, 10, 15, 20, 30, 40, 50, 60, 70, 80, 90, 100, or higher, "A" represents a hard block or segment, "B" represents a soft block or segment, and "C" represents either a hard or soft block or segment. Preferably, As, Bs, and Cs are linked in a linear fashion, not in a branched or a star fashion.

Further embodiments of the invention can be represented by the following formula:

A-(BC)$_n$-A or A-(BC)$_n$-B or A-(BC)$_n$-C or B-(AC)n-A or B-(AC)$_n$-B or B-(AC)$_n$-C or C-(AB)$_n$-A or C-(AB)$_n$-B or C-(AB)$_n$-C where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

"Hard" blocks or segments refer to semi-crystalline blocks of polymerized units in which butene is present in an amount greater than about 80 mole percent, and preferably greater than 88 mole percent. In other words, the comonomer content in the hard segments is less than 20 mole percent, and preferably less than 12 weight percent. In some embodiments, the hard segments comprises all or substantially all butene. "Soft" blocks or segments, on the other hand, refer to blocks of polymerized units in which the comonomer content is greater than 20 mole percent, preferably greater than 25 mole percent, up to 100 mole percent. In some embodiments, the comonomer content in the soft segments can be greater than 20 mole percent, greater than 25 mole percent, greater than 30 mole percent, greater than 35 mole percent, greater than 40 mole percent, greater than 45 mole percent, greater than 50 mole percent, or greater than 60 mole percent.

In a preferred embodiment, the polymers of the invention possess a most probable distribution of block lengths. Preferred polymers according to the invention are block interpolymers containing 2 or 3 blocks or segments. In a polymer containing three or more segments (that is blocks separated by a distinguishable block) each block may be the same or chemically different and generally characterized by a distribution of properties.

Not wishing to be bound by any particular theory, the following mathematical treatment of the resulting polymers is based on theoretically derived parameters that are believed to apply to the inventive polymers and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein p, is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, *J. Macromol. Sci., Rev. Macromol. Chem.*, C8, 1 (1972) and A. E. Hamielec and J. F. MacGregor, "Polymer Reaction Engineering", K. H. Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by $X_i[n]$, where n is an integer from 1 to infinity representing the total number of monomer units in the block.

$$X_i[n] = (1-p_i)p_i^{(n-1)} \quad \text{most probable distribution of block lengths}$$

$$N_i = \frac{1}{1-p_i} \quad \text{number average block length}$$

If more than one catalyst is present in a reactor or zone, each catalyst has a probability of propagation ($p_i$) which results in a unique average block length and distribution for polymer being made in that reactor or zone. In a most preferred embodiment the probability of propagation is defined as:

$$p_i = \frac{Rp[i]}{Rp[i]+Rt[i]+Rs[i]+[C_i]} \quad \text{for each catalyst } i = \{1, 2 \ldots \},$$

where,

Rp[i]=Local rate of monomer consumption by catalyst i, (moles/L/time),
Rt[i]=Total rate of chain transfer and termination for catalyst i, (moles/L/time), and
Rs[i]=Local rate of chain shuttling with dormant polymer, (moles/L/time).

For a given reactor the polymer propagation rate, Rp[i], is defined using an apparent rate constant, $\overline{k_{pi}}$, multiplied by a total monomer concentration, [M], and multiplied by the local concentration of catalyst i, [Ci], as follows:

$$Rp[i]=\overline{k_{pi}}[M][C_i]$$

The chain transfer, termination, and shuttling rate is determined as a function of chain transfer to hydrogen ($H_2$), beta hydride elimination, and chain transfer to chain shuttling agent (CSA). The quantities [$H_2$] and [CSA] are molar concentrations and each subscripted k value is a rate constant for the reactor or zone:

$$Rt[i]=k_{H2i}[H_2][C_i]+k_{\beta i}[C_i]+k_{ai}[CSA][C_i]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [$CSA_f$] is the feed concentration of CSA, and the quantity ([$CSA_f$]−[CSA]) represents the concentration of dormant polymer chains:

$$Rs[i]=k_{ai}[C_i]([CSA_f]-[CSA])$$

As a result of the foregoing theoretical treatment, it may be seen that the overall block length distribution for each block of the resulting block copolymer is a sum of the block length distribution given previously by $X_i[n]$, weighted by the local polymer production rate for catalyst i. This means that a polymer made under at least two different polymer forming conditions will have at least two distinguishable blocks or segments each possessing a block length based on a most probable block length distribution, in an ideal case.

Because the polymer is comprised of two or more blocks or segments which are joined to form a single polymer, and each block or segment is chemically or physically distinguishable (other than by molecular weight or molecular weight distribution) from adjoining blocks or segments, the resulting block copolymer possesses unique physical and chemical properties compared to random copolymers of the same gross chemical composition.

The invention also comprises a composition comprising a copolymer, especially such a copolymer comprising in polymerized form butene and a copolymerizable comonomer, said copolymer comprising two or more intramolecular regions comprising differing chemical or physical properties, especially regions of differentiated comonomer incorporation, wherein the butene/α-olefin block interpolymer is mesophase separated. Highly preferably the copolymer possesses a molecular weight distribution, Mw/Mn, of less than 2.8, preferably in the range of from about 1.4 to about 2.8.

The invention also comprises a composition comprising at least one butene/α-olefin interpolymer comprising two or more substantially homogeneous intramolecular segments or blocks comprising differing chemical or physical properties and having a difference in mole percent α-olefin content, said intramolecular segments characterized by possessing a most probable molecular weight distribution, wherein the ethylene/α-olefin block interpolymer is characterized by a molecular weight distribution, $M_w/M_n$, in the range of from about 1.4 to about 2.8 and:

(a) has at least one melting point, $T_m$, in degrees Celsius, and a density, d, in grams/cubic centimeter, wherein the numerical values of $T_m$ and d correspond to the relationship:

$$T_m > -6553.3 + 13735(d) - 7051.7(d)^2, \text{ or}$$

(b) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (c) has a storage modulus at 25° C., G'(25° C.), and a storage modulus at 100° C., G'(100° C.), wherein the ratio of G'(25° C.) to G'(100° C.) is in the range of about 1:1 to about 9:1; or (d) is characterized by an average block index greater than zero and up to about 1.0; and, wherein the butene/α-olefin block interpolymer is mesophase separated.

In addition, the invention comprises a butene/α-olefin block copolymer wherein the copolymer is characterized by an average molecular weight of greater than 30,000 g/mol, a molecular weight distribution, Mw/Mn, in the range of from about 1.4 to about 2.8, and a difference in mole percent α-olefin content between blocks of greater than about 20 mole percent.

The invention also comprises an article made from the above described butene/α-olefin block copolymer.

Highly desirably, the polymer products herein comprise at least some quantity of a polymer containing two distinguishable blocks or segments characterized by a most probable distribution of block sizes. The polymer recovered from the second reactor or zone of a two reactor or two zone process, may be terminated to form a diblock copolymer, coupled through use of a polyfunctional coupling agent to form a triblock- or a multiblock copolymer, including dendrimers, or functionalized by conversion of terminal chain shuttling agent into vinyl-, hydroxyl-, amine-, silane, carboxylic acid-, carboxylic acid ester, ionomeric, or other functional group, according to known techniques.

In yet another embodiment of the invention, the shuttling agent employed in the foregoing processes possesses multiple sites for undergoing polymer exchange, that is, it is multi-centered, especially two centered, which uniquely causes the formation of a polymer product comprising copolymers according to the invention containing three or more distinct polymer segments after undergoing sequential polymerization in two reactors or zones connected in series.

In a still further embodiment of the present invention, there is provided a polymer mixture comprising: (1) an organic or inorganic polymer, preferably a homopolymer of ethylene or of propylene and/or a copolymer of ethylene or propylene with one or more copolymerizable comonomers, and (2) a block copolymer according to the present invention or prepared according to the process of the present invention. In a desirable embodiment component (1) is a matrix polymer comprising high density polyethylene or isotactic polypropylene and component (2) is an elastomeric block copolymer according to the present invention containing two or three distinct regions of differentiated comonomer incorporation. In a preferred embodiment, component (2) comprises occlusions of the matrix polymer formed during compounding of components (1) and (2).

The inventive block interpolymers form mesophase separated structures with domains larger than those from monodisperse block copolymers of the prior art, namely greater than 60 nm in the smallest dimension, despite having low molecular weights (Mw<200,000 g/mol).

Those skilled in the art will recognize that the size of the domains can be controlled by varying the molecular weight or changing the difference in comonomer content of the block interpolymer. The sizes of the domains can also be modified by blending another component with the bulk copolymer. Suitable blend components include homopolymer or copolymer with similar composition of one of the respective blocks or segments of the copolymers, oils such as mineral oil, solvents such as toluene or hexane.

While the foregoing process has been described as preferably forming a diblock product, it is an additional object of the invention to prepare multi-block copolymers, including hyper-branched or dendrimeric copolymers, through coupling of polymer terminated with a chain shuttling agent exiting the second reactor or zone (or any subsequent reactor or zone) using a difunctional or polyfunctional coupling agent. In addition, if more than two reactors are employed, the product resembles that made by living polymerization in more than one reactor, with the difference that each block of the present polymers possesses a most probable distribution of molecular weights and composition. In particular, the polydispersity of the present polymers is generally less than 2.4 and can approach 1.5 for product made in two reactors.

The theoretical limit of Mw/Mn generally equals the value of (1+1/n), where n is the number of reactors employed in the polymer's production, in accordance with the calculations of *J. Appl. Poly. Sci.*, 92, 539-542 (2004). In a series of two reactors, the theoretical limit for Mw/Mn equals the value of 2*(1−f1*f2), where f1 and f2 are the mass fractions of polymer comprising the two blocks, in accordance with the calculations described in *Macromolecules* 40, 7061-7064 (2007).

In general, the average number of blocks in the absence of coupling of the present polymers will be equal to the number of reactors employed. The skilled artisan will appreciate that the product of the present polymerization will normally include quantities of conventional polymer depending on the efficiency of the particular shuttling agent employed under the conditions of the polymerization.

The butene/α-olefin interpolymers of the invention may be characterized as mesophase separated. Domain sizes are typically in the range of from about 40 nm to about 300 nm, preferably in the range of from about 50 nm to about 250 nm, and more preferably in the range of from about 60 nm to about 200 nm, as measured by the smallest dimension. In addition, domains may have smallest dimensions that are greater than about 60 nm, greater than about 100 nm, and greater than about 150 nm. Domains may be characterized as cylinders, spheres, lamellae or other known morphologies for mesophase separated polymers. The mesophase separated polymers comprise olefin block copolymers wherein the amount of comonomer in the soft segments as compared to that in the hard segments is such that the block copolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as $\chi N$, to achieve mesophase separation in these polydisperse block copolymers is predicted to be $\chi N=2.0$ (I. I. Potemkin, S. V. Panyukov, *Phys. Rev. E.* 57, 6902 (1998)). Recognizing that fluctuations usually push the order-disorder transition in commercial block copolymers to slightly higher $\chi N$, a value $\chi N=2.34$ has been used as the minimum in the calculations below. Following the approach of D. J. Lohse, W. W. Graessley, *Polymer Blends Volume 1: Formulation*, ed. D. R. Paul, C. B. Bucknall, 2000, $\chi N$ can be converted to the product of $\chi/v$ and $Mb/\rho$ where $v$ is a reference volume, Mb is the number average block molecular weight and $\rho$ is the melt density. The melt density is taken to be 0.78 g/cm$^3$. $\chi/v$ for cases in which the comonomer is butene or ethylene is determined using 130 C as the temperature and then performing an interpolation or extrapolation of the data provided in Table 8.1 in the reference by Lohse and Graessley. For each comonomer type, a linear regression in mole percent comonomer is performed. For cases in which octene is the comonomer, the same procedure is performed with the data of Reichart, G. C. et al, *Macromolecules* (1998), 31, 7886. Using Mn, the number average molecular weight of all molecules in units of g/mole, the following equation describes the minimum comonomer difference between the blocks to achieve mesophase separation:

$$\Delta(\text{percent comonomer}) \geq A/(Mn)^{0.5}$$

When octene is the comonomer, A is greater than or equal to about 12950, preferably greater than or equal to about 14240, more preferably greater than or equal to about 14895, and may also be greater than or equal to about 15530, greater than or equal to about 16190 and greater than or equal to about 16835 mole percent. When propylene is the comonomer, A is greater than or equal to about 28600, preferably greater than or equal to about 31460, more preferably greater than or equal to about 32895, and may also be greater than or equal to about 34300, greater than or equal to about, greater than or equal to about 35760 and greater than or equal to about 37180. When ethylene is the comonomer, A is greater than or equal to about 6953, preferably greater than or equal to about 7649, more preferably greater than or equal to about 7997, and may also be greater than or equal to about 8337, greater than or equal to about 8692 and greater than or equal to about 9037. When Mn=644,000 g/mol and the comonomer is 1-octene, the difference in mole percent octene between the hard segment and the soft segment, A octene, is greater than or equal to about 16.1 mole percent, preferably greater than or equal to about 17.7 mole percent, more preferably greater than or equal to about 18.5 mole percent and may also be greater than or equal to about 19.3 mole percent, greater than or equal to about 20.1 mole percent and greater than or equal to about 20.9 mole percent. In addition, the $\Delta$ octene value may be in the range of from about 16.1 mole percent to about 50 mole percent, preferably in the range of from about 18 mole percent to about 40 mole percent and more preferably in the range of from about 20 mole percent to about 35 mole percent. When Mn=644,000 g/mol and the comonomer is propylene, the difference in mole percent propylene between the hard segment and the soft segment, $\Delta$ propylene, is greater than or equal to about 35.6 mole percent, preferably greater than or equal to about 39.2 mole percent, more preferably greater than or equal to about 40.9 mole percent and may also be greater than or equal to about 42.7 mole percent, greater than or equal to about 44.5 mole percent and greater than or equal to about 46.3 mole percent. In addition, the $\Delta$ propylene value may be in the range of from about 35 mole percent to about 80.0 mole percent, preferably in the range of from about 40 mole percent to about 70 mole percent and more preferably in the range of from about 44 mole percent to about 60 mole percent. When Mn=644,000 g/mol and the comonomer is ethylene, the difference in mole percent ethylene between the hard segment and the soft segment, $\Delta$ ethylene, is greater than or equal to about 8.6 mole percent, preferably greater than or equal to about 9.5 mole percent, more preferably greater than or equal to about 9.9 mole percent and may also be greater than or equal to about 10.3 mole percent, greater than or equal to about 10.8 mole percent and greater than or equal to about 11.2 mole percent. In addition, the $\Delta$ ethylene value may be in the range of from about 8.6 mole percent to about 50 mole percent, preferably in the range of from about 10 mole percent to about 30 mole percent and more preferably in the range of from about 11 mole percent to about 25 mole percent.

The mesophase separated butene/$\alpha$-olefin interpolymers may have characteristics of photonic crystals, periodic optical structures designed to affect the motion of photons. Certain compositions of these mesophase separated butene/$\alpha$-olefin interpolymers appear pearlescent by eye. In some instances, films of the mesophase separated butene/$\alpha$-olefin interpolymers reflect light across a band of wavelengths in the range between 200-1200 nm. For example, certain films appear blue via reflected light but yellow via transmitted light. Other compositions reflect light in the ultraviolet (UV) range, from 200-400 nm, while others reflect light in the infrared (IR) range, from approximately 750 nm-1000 nm.

The butene/$\alpha$-olefin interpolymers are characterized by an average block index, ABI, which is greater than zero and up to about 1.0 and a molecular weight distribution, $M_w/M_n$, greater than about 1.4. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where is the block index for the i$^{th}$ fraction of the inventive butene/$\alpha$-olefin interpolymer obtained in preparative TREF, and $w_i$ is the weight percentage of the i$^{th}$ fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the ATREF (i.e., analytical TREF) elution temperature for the $i^{th}$ fraction (preferably expressed in Kelvin), $P_X$ is the butene mole fraction for the $i^{th}$ fraction, which can be measured by NMR or IR as described below. $P_{AB}$ is the butene mole fraction of the whole butene/α-olefin interpolymer (before fractionation), which also can be measured by NMR or IR. $T_A$ and $P_A$ are the ATREF elution temperature and the butene mole fraction for pure "hard segments" (which refer to the crystalline segments of the interpolymer). As an approximation or for polymers where the "hard segment" composition is unknown, the $T_A$ and $P_A$ values are set to those for high density polybutene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$\text{Ln } P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$\text{Ln } P = -237.83/T_{ATREF} + 0.639$$

$T_{AB}$ is the ATREF elution temperature for a random copolymer of the same composition and preferably with the same tacticity and regio defects that produces the hard segments within the block copolymer (having a butene mole fraction of $P_{AB}$) and molecular weight as the inventive copolymer. $T_{AB}$ can be calculated from the mole fraction of butene (measured by NMR) using the following equation:

$$\text{Ln } P_{AB} = \alpha/T_{AB} + \beta$$

where α and β are two constants which can be determined by a calibration using a number of well characterized preparative TREF fractions of a broad composition random copolymer and/or well characterized random butene copolymers with narrow composition. Ideally, the TREF fractions have been prepared from random butene copolymers produced with substantially the same or similar catalyst as the hard segments expected within the block copolymer. This is important to account for slight temperature differences that result in the butene crystallinity due to defects from tacticity and regio insertion errors. If such random copolymers are not available, TREF fractions from random copolymers produced by a Ziegler-Natta catalyst known to produce polybutene can be used. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible.

$T_{XO}$ is the ATREF temperature for a random copolymer of the same composition (i.e., the same comonomer type and content) and the same molecular weight and having a butene mole fraction of $P_X$. $T_{XO}$ can be calculated from $\text{Ln}P_X = \alpha/T_{XO} + \beta$ from a measured $P_X$ mole fraction. Conversely, $P_{XO}$ is the butene mole fraction for a random copolymer of the same composition (i.e., the same comonomer type and content) and the same molecular weight and having an ATREF temperature of $T_X$, which can be calculated from $\text{Ln } P_{XO} = \alpha/T_X + \beta$ using a measured value of T.

Further description of the block index methodology is referenced in *Macromolecular Symposia*, Vol 257, (2007), pp 80-93 which is incorporated by reference herein in its entirety.

Once the block index (BI) for each preparative TREF fraction is obtained, the weight average block index, ABI, for the whole polymer can be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive butene/α-olefin interpolymer is that the inventive butene/α-olefin interpolymer comprises at least one polymer fraction which can be obtained by preparative TREF, wherein the fraction has a block index greater than about 0.1 and up to about 1.0 and the polymer has a molecular weight distribution, $M_w/M_n$, greater than about 1.4. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

In addition to an average block index and individual fraction block indices, the butene/α-olefin interpolymers are characterized by one or more of the properties described as follows.

In one aspect, the butene/α-olefin interpolymers used in embodiments of the invention have a $M_w/M_n$, from about 1.7 to about 3.5 and at least one melting point, $T_m$, in degrees Celsius and α-olefin content, in weight %, wherein the numerical values of the variables correspond to the relationship:

$$T_m > -2.909(\text{wt \% α-olefin}) + 150.57, \text{ and preferably}$$

$$T_m \geq -2.909(\text{wt \% α-olefin}) + 145.57, \text{ and more preferably}$$

$$T_m \geq -2.909(\text{wt \% α-olefin}) + 141.57$$

Unlike the traditional random copolymers of butene/α-olefins whose melting points decrease with decreasing densities, the inventive interpolymers exhibit melting points substantially independent of the α-olefin content, particularly when α-olefin content is between about 2 to about 15 weight %.

In yet another aspect, the butene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random butene interpolymer fraction eluting between the same temperatures, wherein the comparable random butene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In other embodiments, the butene/α-olefin interpolymers have (1) a storage modulus ratio, G'(25° C.)/G'(100° C.), of from 1 to 20, preferably from 1 to 10, more preferably from 1 to 5; and/or (2) a 70° C. compression set of less than 80 percent, preferably less than 70 percent, especially less than 60 percent, less than 50 percent, or less than 40 percent, down to a compression set of 0 percent.

In still other embodiments, the butene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In other embodiments, the butene/α-olefin interpolymers comprise, in polymerized form, at least 50 mole percent butene and have a 70° C. compression set of less than 80 percent, preferably less than 70 percent or less than 60 percent, most preferably less than 40 to 50 percent and down to close to zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the inventive block interpolymers have additional characteristics or properties. In one aspect, the interpolymers, preferably comprising butene and one or more copolymerizable comonomers in polymerized form, are characterized by multiple blocks or segments of two or more polymerized monomer units differing in chemical or physical properties (blocked interpolymer), most preferably a diblock copolymer or a triblock copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random butene interpolymer fraction eluting between the same temperatures, wherein said comparable random butene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

Preferably, for interpolymers of butene and ethylene, the block interpolymer has a comonomer content of the TREF fraction eluting between 40 and 130° C. greater than or equal to the quantity $(-0.1236) T + 13.337$, more preferably greater than or equal to the quantity $(-0.1236) T + 14.837$, where T is the numerical value of the peak elution temperature of the TREF fraction being compared, measured in ° C.

In addition to the above aspects and properties described herein, the inventive polymers can be characterized by one or more additional characteristics. In one aspect, the inventive polymer is an olefin interpolymer, preferably comprising butene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random butene interpolymer fraction eluting between the same temperatures, wherein said comparable random butene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance (NMR) spectroscopy preferred. Using this technique, said blocked interpolymer has a higher molar comonomer content than a corresponding comparable interpolymer.

Preferably, the above interpolymers are interpolymers of butene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1236)T+13.337, more preferably greater than or equal to the quantity (−0.1236) T+14.337, and most preferably greater than or equal to the quantity (−0.1236)T+13.837, where T is the numerical value of the peak ATREF elution temperature of the TREF fraction being compared, measured in ° C.

In addition to the above aspects and properties described herein, the inventive polymers can be characterized by one or more additional characteristics. In one aspect, the inventive polymer is an olefin interpolymer, preferably comprising butene and one or more copolymerizable comonomers in polymerized form, characterized by multiple blocks or segments of two or more polymerized monomer units differing in chemical or physical properties (blocked interpolymer), most preferably a diblock or triblock copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random butene interpolymer fraction eluting between the same temperatures, wherein said comparable random butene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

In still another aspect, the inventive polymer is an olefin interpolymer, preferably comprising butene and one or more copolymerizable comonomers in polymerized form, characterized by multiple blocks or segments of two or more polymerized monomer units differing in chemical or physical properties (blocked interpolymer), most preferably a diblock or triblock copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction})+135.90.$$

In yet another aspect, the inventive polymer is an olefin interpolymer, preferably comprising butene and one or more copolymerizable comonomers in polymerized form, characterized by multiple blocks or segments of two or more polymerized monomer units differing in chemical or physical properties (blocked interpolymer), most preferably a diblock or triblock copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion(J/gm)} \leq (3.1718)(\text{ATREF elution temperature in Celsius})-136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion(J/gm)} \leq (1.1312)(\text{ATREF elution temperature in Celsius})+22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.con).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl($CH_3$) groups of the polymer. The mathematical ratio of the composition signal ($CH_3$) divided by the measurement signal ($CH_2$) is sensitive to the comonomer content of the measured polymer in solution and its response is calibrated with known butene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers", *Polymeric Materials Science and Engineering* (1991), 65, 98-100.; and Deslauriers, P. J.; Rohlfing, D.

C.; Shieh, E. T.; "Quantifying short chain branching microstructures in ethylene-1-olefin copolymers using size exclusion chromatography and Fourier transform infrared spectroscopy (SEC-FTIR)", *Polymer* (2002), 43, 59-170, both of which are incorporated by reference herein in their entirety.

It should be noted that while the TREF fractions in the above description are obtained in a 5° C. increment, other temperature increments are possible. For instance, a TREF fraction could be in a 4° C. increment, a 3° C. increment, a 2° C. increment, or 1° C. increment.

For copolymers of butene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) a butene content of at least 50 weight percent; (4) a glass transition temperature, $T_g$, of less than −5° C., more preferably less than −15° C., and/or (5) one and only one $T_m$.

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. that is characteristic of block copolymers, and heretofore unknown for an olefin copolymer, especially a copolymer of butene and one or more $C_2$ or $C_{4-8}$ aliphatic α-olefins. (By the term "relatively flat" in this context is meant that log G' (in Pascals) decreases by less than one order of magnitude between 50 and 100° C., preferably between 0 and 100° C.).

Additionally, the butene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the butene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the butene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1,000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm$^3$ and preferably for ethylene containing polymers from 0.85 g/cm$^3$ to 0.97 g/cm$^3$. In certain embodiments, the density of the butene/α-olefin polymers ranges from 0.860 to 0.925 g/cm$^3$ or 0.867 to 0.910 g/cm$^3$.

The general process of making the polymers has been disclosed in the following patent applications and publications: U.S. Provisional Application No. 60/717,545, filed Sep. 15, 2005, and PCT Publication No. WO 2007/035485, filed Sep. 14, 2006 both of which are incorporated by reference herein in their entirety. For example, one such method comprises a process for the polymerization of one or more addition polymerizable monomers, preferably of two or more addition polymerizable monomers, especially butene and at least one copolymerizable comonomer, propylene and at least one copolymerizable comonomer having from 5 to 20 carbons, or 4-methyl-1-pentene and at least one different copolymerizable comonomer having from 4 to 20 carbons, to form a copolymer comprising two regions or segments of differentiated polymer composition or properties, especially regions comprising differing comonomer incorporation index, said process comprising:

1) contacting an addition polymerizable monomer or mixture of monomers under addition polymerization conditions, preferably uniform or homogeneous polymerization conditions, in a reactor or reactor zone with a composition comprising at least one olefin polymerization catalyst and a cocatalyst and characterized by the formation of polymer segments from said monomer or monomers;

2) transferring the reaction mixture to a second reactor or reactor zone and optionally adding one or more additional reactants, catalysts, monomers or other compounds prior to, contemporaneously with, or after said transfer; and 3) causing polymerization to occur in said second reactor or reactor zone to form polymer segments that are differentiated from the polymer segments formed in step 1);

said process being characterized by addition of a chain shuttling agent to the reaction mixture prior to, during, or subsequent to step 1) such that at least some of the resulting polymer molecules from step 3) comprises two or more chemically or physically distinguishable blocks or segments.

The invention involves the concept of using chain shuttling as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer resulting from the present process comprises two, three, or more, preferably two or three, differentiated polymer segments arranged intramolecularly. Because the various reactors or zones form a distribution of polymers rather than a single specific polymer composition, the resulting product has improved properties over a random copolymer or monodisperse block copolymer.

In contrast with the previously discussed sequential polymerization techniques wherein no chain shuttling agent is utilized, polymer products can now be obtained according to the present invention by selecting highly active catalyst compositions capable of rapid transfer of polymer segments both to and from a suitable chain shuttling agent such that polymer blocks or regions made by the catalyst possess distinguishable polymer properties. Due to the use of chain shuttling agents and catalysts capable of rapid and efficient exchange of growing polymer chains, the growing polymer experiences discontinuous polymer growth, such that intramolecular regions of the polymer are formed under two or more different polymerization conditions.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teach ings of WO 03/40195, 2003US0204017, U.S. Ser. No. 10/429,024, filed May 2, 2003, and WO 04/24740:

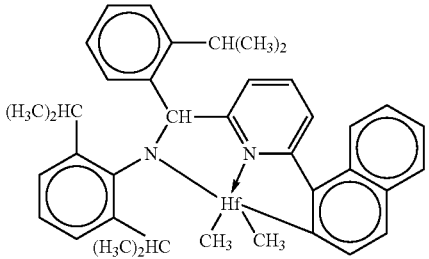

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740:

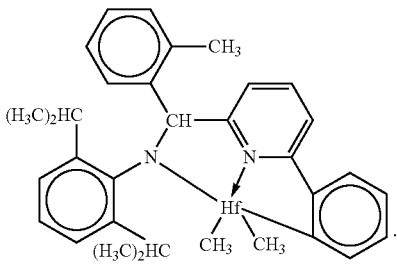

Catalyst (A3) is bis[N,N'''-(2,4,6-tri(methylphenyl)amido)ethylenediamine]hafnium dibenzyl:

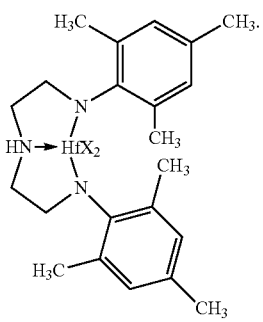

X = CH$_2$C$_6$H$_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103:

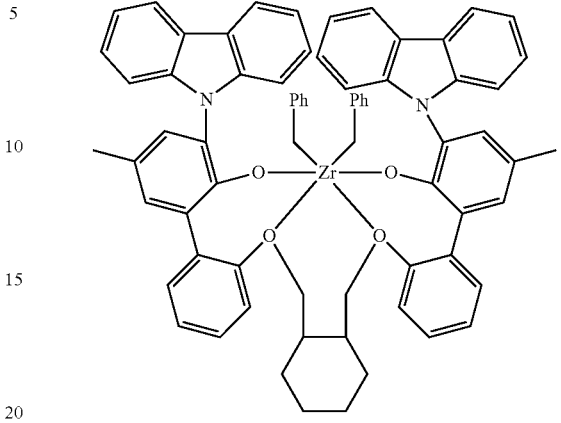

Catalyst (A5) is (bis-(1-methylethyl)(2-oxoyl-3,5-di(t-butyl)phenyl)immino)zirconium dibenzyl, prepared substantially according to the teachings of U.S. provisional application 60/553,906, filed Mar. 17, 2004, and PCT/US05/08917, filed Mar. 17, 2005 and WO2005/090427, published Sep. 29, 2005:

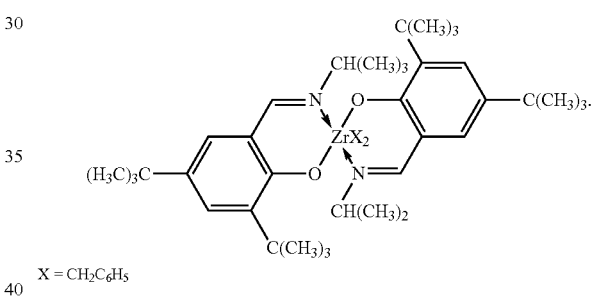

X = CH$_2$C$_6$H$_5$

Catalyst (A6) is bis-(1-(2-methylcyclohexyl)ethyl)(2-oxoyl-3,5-di(t-butyl)phenyl)immino)zirconium dibenzyl, prepared substantially according to the teachings of U.S. provisional application 60/553,906, filed Mar. 17, 2004, and PCT/US05/08917, filed Mar. 17, 2005 and WO2005/090427, published Sep. 29, 2005:

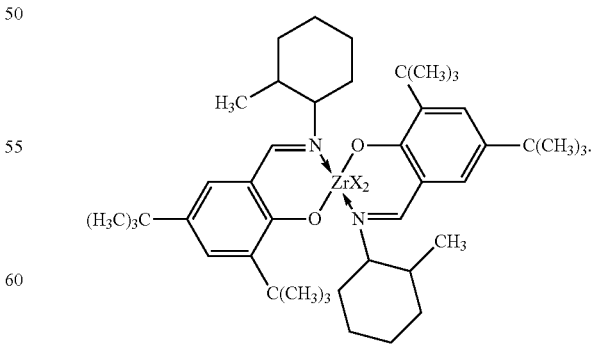

X = CH$_2$C$_6$H$_5$

Catalyst (A7) is (t-butylamido)dimethyl(3-N-pyrrolyl-1,2,3,3a,7a-η-inden-1-yl)silanetitanium dimethyl prepared sub stantially according to the techniques of U.S. Pat. No. 6,268,444:

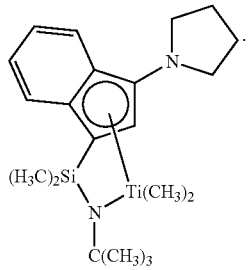

Catalyst (A8) is (t-butylamido)di(4-methylphenyl)(2-methyl-1,2,3,3a,7a-η-inden-1-yl)silanetitanium dimethyl prepared substantially according to the teachings of US-A-2003/004286:

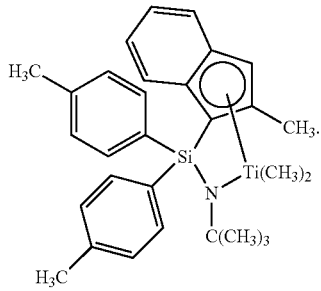

Catalyst (A9) is (t-butylamido)di(4-methylphenyl)(2-methyl-1,2,3,3a,8a-η-s-indacen-1-yl)silanetitanium dimethyl prepared substantially according to the teachings of US-A-2003/004286:

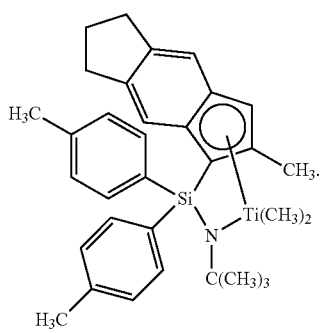

Catalyst (A10) is bis(dimethyldisiloxane)(indene-1-yl)zirconium dichloride available from Sigma-Aldrich:

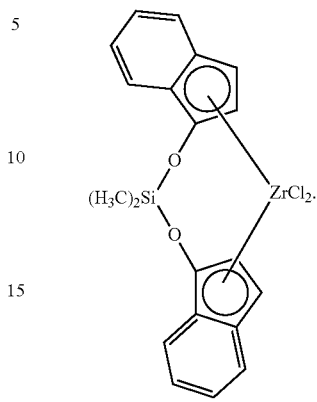

Catalyst (A11) is bis-(1-(2-methylcyclohexyl)ethyl)(2-oxoyl-3(t-butyl)phenyl)immino)zirconium dibenzyl, prepared substantially according to the teachings, prepared substantially according to the teachings of WO2005/090426, published Sep. 29, 2005.

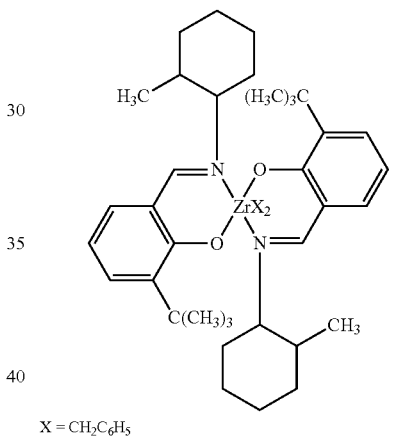

$X = CH_2C_6H_5$

Cocatalysts

Each of the metal complexes (also interchangeably referred to herein as procatalysts) may be activated to form the active catalyst composition by combination with a cocatalyst, preferably a cation forming cocatalyst, a strong Lewis acid, or a combination thereof. In a preferred embodiment, the shuttling agent is employed both for purposes of chain transfer and as the optional cocatalyst component of the catalyst composition. Suitable cocatalysts are described in U.S. Provisional Application No. 60/717,545, filed Sep. 15, 2005 and WO2007/035485, published on Mar. 29, 2007, each of which is herein incorporated by reference.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Chain Shuttling Agents

The term, "shuttling agent" or "chain shuttling agent", refers to a compound or mixture of compounds that is capable of causing polymeryl transfer between the various active catalyst sites under the conditions of the polymerization. That is, transfer of a polymer fragment occurs both to and from an active catalyst site in a facile manner. In contrast to a shuttling agent, a "chain transfer agent" causes termination of polymer chain growth and amounts to a one-time transfer of growing polymer from the catalyst to the transfer agent. Desirably, the intermediate formed between the chain shuttling agent and the polymeryl chain is sufficiently stable that chain termination is relatively rare. Desirably, less than 10 percent, preferably less than 50 percent, more preferably less than 75 percent and most desirably less than 90 percent of shuttling agent-polymeryl products are terminated prior to attaining 2 distinguishable, intramolecular polymer segments or blocks.

While attached to the growing polymer chain, the shuttling agent desirably does not alter the polymer structure or incorporate additional monomer. That is, the shuttling agent does not also possess significant catalytic properties for the polymerization of interest. Rather, the shuttling agent forms a metal-alkyl or other type interaction with the polymer moiety, for a time period such that transfer of the polymer moiety to an active polymerization catalyst site in a subsequent reactor may occur. As a consequence, the subsequently formed polymer region possesses a distinguishable physical or chemical property, such as a different monomer or comonomer identity, a difference in comonomer composition distribution, crystallinity, density, tacticity, regio-error, or other property. Subsequent repetitions of the foregoing process can result in formation of segments or blocks having differing properties, or a repetition of a previously formed polymer composition, depending on the rates of polymeryl exchange, number of reactors or zones within a reactor, and transport between the reactors or zones. The polymers of the invention desirably are characterized by at least two individual blocks or segments having a difference in composition and a most probable block length distribution. That is, adjacent blocks have altered composition within the polymer and a size distribution (Mw/Mn) greater than 1.0, preferably greater than 1.2.

Figure 2:
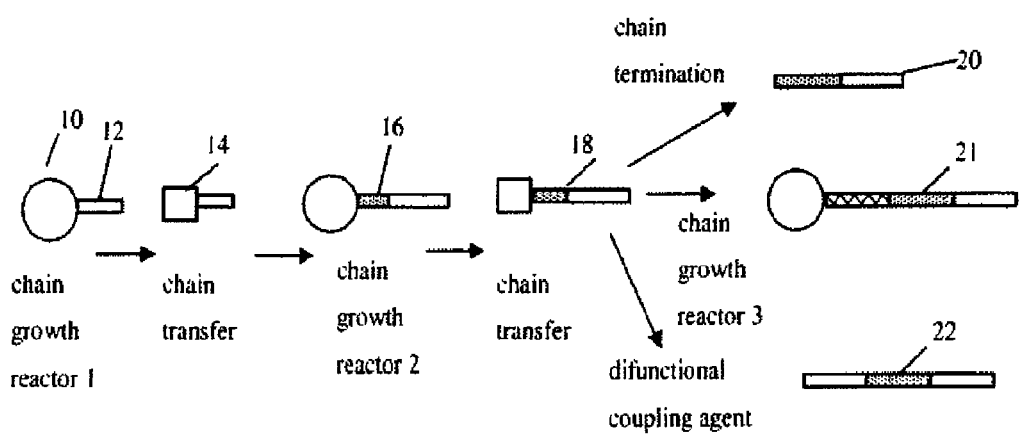
FIG. 2 is a schematic representation of the process of copolymer formation according to the present invention in two or more different reactors.

The process of the invention employing a catalyst, one or more cocatalysts, and chain shuttling agent may be further elucidated by reference to FIG. 2, where there is illustrated an activated catalyst, 10, which in a first reactor operating under steady state polymerization conditions or in a first polymerization zone operating under plug flow polymerization conditions forms a polymer chain, 12. A chain shuttling agent, 14, added along with the initial charge of reactants or later in the polymerization process, including just prior to or during transfer to a second reactor or zone, attaches to the polymer chain produced by an active catalyst site thereby preventing termination of the polymer chain prior to entering the second reactor or zone. In the presence of modified polymerization conditions, the polymer block attached to the chain shuttling agent is transferred back to a catalyst site, and a new polymer segment, 16, which preferably is distinguishable from polymer segment 12, is produced. The resulting diblock copolymer may also attach to an available chain shuttling agent forming the combination of a chain shuttling agent with the diblock copolymer, 18 prior to exiting the second reactor or zone. Transfer of the growing polymer multiple times to an active catalyst site may occur with continued growth of the polymer segment. Under uniform polymerization conditions, the growing polymer chain is substantially homogeneous, although individual molecules may differ in size. The first and second polymer segments formed in the process are distinguishable because the polymerization conditions in existence at the time of formation of the respective blocks or segments are different and the chain shuttling agent is able to prolong the polymer life time (that is the time during which further polymer growth may occur) until two or more different polymerization environments are experienced. The diblock copolymer chains, 20, may be recovered by termination, such as by reaction with water or other proton source, or functionalized, if desired, forming vinyl, hydroxyl, silane, carboxylic acid, carboxylic acid ester, ionomeric, or other functional terminal groups to replace the chain shuttling agent. Alternatively, the diblock polymer segment may be coupled with a polyfunctional coupling agent, especially a difunctional coupling agent such as dichlorodimethylsilane or ethylenedichloride, and recovered as a triblock copolymer, 22. It is also possible to continue polymerization in a third reactor or zone under conditions differing from those in the second reactor or zone, and recovering the resulting triblock copolymer, 21. If the third reactor's conditions are substantially identical to those of the initial reactor or zone, the product will be substantially similar to a conventional triblock copolymer, but with block lengths that are a most probable distribution.

Ideally, the rate of chain shuttling is equivalent to or faster than the rate of polymer termination, even up to 10 or even 100 times faster than the rate of polymer termination and significant with respect to the rate of polymerization. This permits formation of distinct polymer blocks in the first reactor or zone and discharge from said reactor or zone into a subsequent reactor or zone of a reaction mixture containing significant quantities of polymer chains terminated with chain shuttling agents and capable of continued monomer insertion under distinguishable polymerization conditions.

By selecting different shuttling agents or mixtures of agents with a catalyst, by altering the comonomer composition, temperature, pressure, optional chain terminating agent such as $H_2$, or other reaction conditions in separate reactors or zones of a reactor operating under plug flow conditions, polymer products having segments of varying density or comonomer concentration, monomer content, and/or other distinguishing properties can be prepared. For example, in a typical process employing two continuous solution polymerization reactors connected in series and operating under differing polymerization conditions, the resulting polymer segments will each have a relatively broad molecular weight distribution characteristic of typical olefin coordination polymerization catalysts, preferably a Mw/Mn from 1.7 to 15, more preferably from 1.8 to 10, but will reflect the polymer formed under the differing polymerization conditions. In addition, certain quantities of a conventional random copolymer may also be formed coincident with formation of the block copolymer of the present invention, resulting in a resin blend. The average block lengths in the resulting polymers may be controlled by the chain shuttling rate of the CSA, the amount of CSA added, and other process variables, such as polymer production rate, and the amount of optional chain termination agent, such as hydrogen, employed. Average block lengths of each block type can be individually controlled by altering process variables in each reactor.

Highly desired copolymers comprise at least one block or segment that is highly crystalline polyethylene or polypropylene, especially highly isotactic polypropylene, joined intramolecularly with one or more separate blocks comprising an amorphous polymer, especially a copolymer of propylene with ethylene and/or a $C_{4-8}$ comonomer. Desirably the foregoing polymer is a diblock copolymer. Additional desirable copolymers are triblock copolymers comprising a central, relatively amorphous polymer block bonded between two relatively crystalline polyolefin polymer blocks.

A suitable composition comprising catalyst, cocatalyst, and a chain shuttling agent especially adapted for use herein can be selected by means of the following multi-step procedure:

I. One or more addition polymerizable, preferably olefin monomers are polymerized using a mixture comprising a potential catalyst and a potential chain shuttling agent. This polymerization test is desirably performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (Mw, Mn, and Mw/Mn or PDI) measured.

II. The foregoing polymerization and polymer testing are repeated for several different reaction times, providing a series of polymers having a range of yields and PDI values.

III. Catalyst/chain shuttling agent pairs demonstrating significant polymer transfer both to and from the chain shuttling agent are characterized by a polymer series wherein the minimum PDI is less than 2.0, more preferably less than 1.5, and most preferably less than 1.4. Furthermore, if chain shuttling is occurring, the Mn of the polymer will increase, preferably nearly linearly, as conversion is increased. Most preferred catalyst/shuttling agent pairs are those giving polymer Mn as a function of conversion (or polymer yield) fitting a line with a statistical precision ($R^2$) of greater than 0.95, preferably greater than 0.99.

Steps I-III are then carried out for one or more additional pairings of potential catalysts and/or putative shuttling agents.

In addition, it is preferable that the chain shuttling agent does not reduce the catalyst activity (measured in weight of polymer produced per weight of catalyst per unit time) by more than 60 percent, more preferably such catalyst activity is not reduced by more than 20 percent, and most preferably catalyst activity of the catalyst is increased compared to the catalyst activity in the absence of a chain shuttling agent. A further consideration from a process viewpoint is that the reaction mixture should possess as low a viscosity as possible to reduce energy consumed in producing a homogeneous reaction mixture or conveying the reaction mixture. In this regard, a monofunctional shuttling agent is preferred to a difunctional agent which in turn is preferred to a trifunctional agent.

The foregoing test is readily adapted to rapid throughput screening techniques using automated reactors and analytic probes and to formation of polymer blocks having different distinguishing properties. For example, a number of potential chain shuttling agent candidates can be pre-identified or synthesized in situ by combination of various organometal compounds with various proton sources and the compound or reaction product added to a polymerization reaction employing an olefin polymerization catalyst composition. Several polymerizations are conducted at varying molar ratios of shuttling agent to catalyst. As a minimum requirement, suitable shuttling agents are those that produce a PDI of less than 2.0 in variable yield experiments as described above, while not significantly adversely affecting catalyst activity, and preferably improving catalyst activity, as above described.

Alternatively, it is also possible to detect desirable catalyst/shuttling agent pairs by performing a series of polymerizations under standard batch reaction conditions and measuring the resulting number average molecular weights, PDI and polymer yield or production rate. Suitable shuttling agents are characterized by lowering of the resultant Mn without significant broadening of PDI or loss of activity (reduction in yield or rate).

Regardless of the method for identifying, a priori, a shuttling agent, the term is meant to refer to a compound that is capable of preparing the presently identified block copolymers under the polymerization conditions herein disclosed.

Suitable shuttling agents for use herein include Group 1, 2, 12 or 13 metal compounds or complexes containing at least one $C_{1-20}$ hydrocarbyl group, preferably hydrocarbyl substituted aluminum, gallium or zinc compounds containing from 1 to 12 carbons in each hydrocarbyl group, and reaction products thereof with a proton source. Preferred hydrocarbyl groups are alkyl groups, preferably linear or branched, $C_{2-8}$ alkyl groups. Most preferred shuttling agents for use in the present invention are trialkyl aluminum and dialkyl zinc compounds, especially triethylaluminum, tri(i-propyl)aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compound, preferably a tri($C_{1-8}$) alkyl aluminum or di($C_{1-8}$) alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl)amine, bis(2,3,6,7-dibenzo-1-azacycloheptaneamine), or 2,6-diphenylphenol. Desirably, sufficient amine or hydroxyl reagent is used such that one hydrocarbyl group remains per metal atom. The primary reaction products of the foregoing combinations most desired for use in the present invention as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferred shuttling agents possess the highest transfer rates of polymer transfer as well as the highest transfer efficiencies (reduced incidences of chain termination). Such shuttling agents may be used in reduced concentrations and still achieve the desired degree of shuttling. Highly desirably, chain shuttling agents with a single exchange site are employed due to the fact that the effective molecular weight of the polymer in the reactor is lowered, thereby reducing viscosity of the reaction mixture and consequently reducing operating costs.

During the polymerization, the reaction mixture is contacted with the activated catalyst composition according to any suitable polymerization conditions. The process is desirably characterized by use of elevated temperatures and pressures. Hydrogen may be employed as a chain transfer agent for molecular weight control according to known techniques, if desired. As in other similar polymerizations, it is highly desirable that the monomers and solvents employed be of sufficiently high purity that catalyst deactivation or premature chain termination does not occur, unless a block copolymer modified polymer product is desired. Any suitable technique for monomer purification such as devolatilization at reduced pressure, contacting with molecular sieves or high surface area alumina, or a combination of the foregoing processes may be employed.

The polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, between the first reactor or zone and the second or any subsequent reactor or zone, or even solely to the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Each reactor in the series can be operated under high pressure, solution, slurry, or gas phase polymerization conditions. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen and moisture free atmosphere, preferably under a dry, inert gas such as nitrogen.

Without limiting in any way the scope of the invention, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149, which are herein incorporated by reference.

Catalyst along with cocatalyst and optionally chain shuttling agent are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen, as is well known in the art. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. Preferably for use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent.

The resulting polymer product is recovered by flashing off volatile components of the reaction mixture such as residual monomers or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

Preferably, the foregoing process takes the form of a continuous solution process for forming block interpolymers, especially diblock or triblock copolymers, preferably linear diblock or triblock copolymers of two or more monomers, more especially butene and ethylene or a $C_{4-20}$ olefin or cycloolefin, and most especially butene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and block interpolymers, especially linear diblock or triblock copolymers are formed in high efficiency.

Polymer Characteristics and Properties

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content, the inventive interpolymers have better (higher) heat resistance as measured by melting point, lower compression set, particularly at elevated temperatures, lower stress relaxation, higher creep resistance, faster setup due to higher crystallization (solidification) temperature, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology.

The butene/α-olefin interpolymers used in the embodiments of the invention are preferably interpolymers of butene with at least one of ethylene, propylene or $C_4$-$C_{20}$ α-olefin. Copolymers of butene and a $C_4$-$C_{20}$ α-olefin are especially preferred. The interpolymers may further comprise $C_4$-$C_{18}$ diolefin and/or alkenylbenzene. Suitable unsaturated comonomers useful for polymerizing with butene include, for example, ethylenically unsaturated monomers, conjugated or nonconjugated dienes, polyenes, alkenylbenzenes, etc. Examples of such comonomers include $C_4$-$C_{20}$ α-olefins such as isobutylene, 1-hexene, 1-pentene, 4-methyl-1-pentene, 1-heptene, 1-octene, 1-nonene, 1-decene, and the like. 1-octene is especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While butene/α-olefin interpolymers are preferred polymers, other butene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are ethylene, propylene or $C_4$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to ethylene, isobutylene, propylene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is ethylene, propylene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising butene and styrene can be prepared by following the teachings herein. Optionally, copolymers comprising butene, styrene and a $C_4$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4- hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of butene, propylene, ethylene, a $C_4$-$C_{20}$ α-olefin, and optionally one or more diene monomers. Preferred α-olefins for use in this embodiment of the present invention are designated by the formula $CH_2$=CHR*, where R* is a linear or branched alkyl group of from 1 to 12 carbon atoms. Examples of suitable α-olefins include, but are not limited to isobutylene, 1-pentene, 1-hexene, 4-methyl-1-pentene, and 1-octene. Such propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The butene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to a butene/α-olefin interpolymer, or may be copolymerized with butene and an optional additional comonomer to form an interpolymer of butene, the functional comonomer and optionally other comonomer(s). Means for grafting functional groups onto polybutene are described for example in U.S. Pat. Nos. 4,762,890, 4,927,888, and 4,950,541, the disclosures of these patents are incorporated herein by reference in their entirety. One particularly useful functional group is maleic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

More on Block Index

Random copolymers satisfy the following relationship. See P. J. Flory, *Trans. Faraday Soc.*, 51, 848 (1955), which is incorporated by reference herein in its entirety.

$$\frac{1}{T_m} - \frac{1}{T_m^0} = -\left(\frac{R}{\Delta H_u}\right) \ln P \qquad (1)$$

In Equation 1, the mole fraction of crystallizable monomers, P, is related to the melting temperature, $T_m$, of the copolymer and the melting temperature of the pure crystallizable homopolymer, $T_m^0$. The equation is similar to the relationship for the natural logarithm of the mole fraction of butene as a function of the reciprocal of the ATREF. elution temperature (° K).

The relationship of butene mole fraction to ATREF peak elution temperature and DSC melting temperature for various homogeneously branched copolymers of similar tacticity and region defects is analogous to Flory's equation. Similarly, preparative TREF fractions of nearly all butene random copolymers and random copolymer blends of similar tacticity and regio defects likewise fall on this line, except for small molecular weight effects.

According to Flory, if P, the mole fraction of butene, is equal to the conditional probability that one butene unit will precede or follow another butene unit, then the polymer is random. On the other hand if the conditional probability that any 2 butene units occur sequentially is greater than P, then the copolymer is a block copolymer. The remaining case where the conditional probability is less than P yields alternating copolymers.

The mole fraction of isotactic butene in random copolymers primarily determines a specific distribution of butene segments whose crystallization behavior in turn is governed by the minimum equilibrium crystal thickness at a given temperature. Therefore, the copolymer melting and TREF crystallization temperatures of the inventive block copolymers are related to the magnitude of the deviation from the random relationship, and such deviation is a useful way to quantify how "blocky" a given TREF fraction is relative to its random equivalent copolymer (or random equivalent TREF fraction). The term "blocky" refers to the extent a particular polymer fraction or polymer comprises blocks of polymerized monomers or comonomers. There are two random equivalents, one corresponding to constant temperature and one corresponding to constant mole fraction of butene. These form the sides of a right triangle.

The point $(T_X, P_X)$ represents a preparative TREF fraction, where the ATREF elution temperature, $T_X$, and the NMR butene mole fraction, $P_X$, are measured values. The butene mole fraction of the whole polymer, $P_{AB}$, is also measured by NMR. The "hard segment" elution temperature and mole fraction, $(T_A, P_A)$, can be estimated or else set to that of an isotactic butene homopolymer (prepared by a stereospecific Ziegler-Natta catalyst) for butene copolymers. The $T_{AB}$ value corresponds to the calculated random copolymer equivalent ATREF elution temperature based on the measured $P_{AB}$. From the measured ATREF elution temperature, $T_X$, the corresponding random butene mole fraction, $P_{XO}$, can also be calculated. The square of the block index is defined to be the ratio of the area of the $(P_X, T_X)$ triangle and the $(T_A, P_{AB})$ triangle. Since the right triangles are similar, the ratio of areas is also the squared ratio of the distances from $(T_A, P_{AB})$ and $(T_X, P_X)$ to the random line. In addition, the similarity of the right triangles means the ratio of the lengths of either of the corresponding sides can be used instead of the areas.

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

It should be noted that the most perfect block distribution would correspond to a whole polymer with a single eluting fraction at the point ($T_A$, $P_{AB}$), because such a polymer would preserve the butene segment distribution in the "hard segment", yet contain all the available octene (presumably in runs that are nearly identical to those produced by the soft segment catalyst). In most cases, the "soft segment" will not crystallize in the ATREF (or preparative TREF).

Applications and End Uses

The inventive mesophase separated butene/α-olefin block interpolymers can be used in a variety of thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or nonwoven fabrics. The polymers may also be used in oriented film made in a double bubble or tenter frame process. Thermoplastic compositions comprising the inventive polymers include blends with other natural or synthetic polymers, additives, reinforcing agents, ignition resistant additives, antioxidants, stabilizers, colorants, extenders, crosslinking agents, blowing agents, and plasticizers. Of particular utility are multi-component fibers such as core/sheath fibers, having an outer surface layer, comprising at least in part, one or more polymers according to embodiments of the invention. The polymers may also be used in articles such as toys; jewelry, such as synthetic opals; and, decorative items, such as films.

They may additionally be used to form photonic crystals, photonic band gap materials, or elastomeric optical interference films. Such materials comprise periodic, phase-separated mesodomains alternating in refractive index, with the domains sized to provide a photonic band gap in the UV-visible spectrum, such as those disclosed in U.S. Pat. No. 6,433,931, which is herein incorporated by reference.

A photonic band gap material is one that prohibits the propagation of electromagnetic radiation within a specified frequency range (band) in certain directions. That is, band gap materials prevent light from propagating in certain directions with specified energies. This phenomenon can be thought of as the complete reflection of electromagnetic radiation of a particular frequency directed at the material in at least one direction because of the particular structural arrangement of separate domains of the material, and refractive indices of those domains. The structural arrangement and refractive indices of separate domains that make up these materials form photonic band gaps that inhibit the propagation of light centered around a particular frequency. (Joannopoulos, et al., "Photonic Crystals, Molding the Flow of Light", Princeton University Press, Princeton, N.J., 1995). One-dimensional photonic band gap materials include structural and refractive periodicity in one direction, two-dimensional photonic band gap materials include periodicity in two directions, and three-dimensional photonic band gap materials include periodicity in three directions.

The reflectance and transmittance properties of a photonic crystal or optical interference film are characterized by the optical thickness of the domains or regions. The optical thickness is defined as the product of the actual thickness times its refractive index. Films can be designed to reflect infrared, visible, or ultraviolet wavelengths of light depending on the optical thickness of the domains.

Useful materials for photonic applications contain blocks or segments characterized by differences in the refractive index of the material comprising the segments or blocks. Suitable choices can be made so as to tailor the refractive index profile of the adjacent domains to selectively concentrate or diffuse the optical field intensity produced by the structure. This can be accomplished by tailoring the composition of the blocks. The refractive index contrast can be further enhanced by blending components that have a preferential affinity for one type of domain. One approach is to employ high index nanoparticle additives, such as CdSe particles, which are coated with a surfactant layer and selectively incorporated into one of the domains. Preferably, the materials have a difference in refractive index of the segments or blocks of 0.01, more preferably 0.02, more preferably 0.03 or greater.

The periodicity in structural arrangement can be met by creating separate domains of size similar to the wavelength (in the material comprising the domain as opposed to in a vacuum (freespace)) of electromagnetic radiation desirably effected or blocked by the structure, preferably domains of size no greater than the wavelength of interest. The refractive index ratios between adjacent domains should be high enough to establish a band gap in the material. Band gap can be discussed with reference to the refractive index ratio ($n_1/n_2$), where $n_1$ is the effective index of refraction of a first domain and $n_2$ is the effective index of refraction of a second domain. In general, the larger the refractive index ratio (refractive contrast) the larger the band gap and, in the present invention, band gap is tailored to be above a predetermined threshold and extends in one dimension for one-dimensional systems, two dimensions for two-dimensional systems, and three dimensions for three-dimensional systems. Suitable choices can be made so as to tailor the refractive index profile of the adjacent domains to selectively concentrate or diffuse the optical field intensity produced by the structure. This can be accomplished in the present invention by tailoring the composition of the hard and soft blocks. The refractive index contrast can be further enhanced by blending components that have a preferential affinity for one type of domain. One approach is to employ high index nanoparticle additives, such as CdSe particles, which are coated with a surfactant layer and selectively incorporated into one of the domains. Preferably, adjacent, dissimilar domains differ in refractive index such that the ratio of the refractive index of one to the other is greater than 1, preferably at least about 1.01, and more preferably at least about 1.02 for a continuous set of wavelengths lying within a wavelength range of from about 100 nm to about 10 μm. In some embodiments, the refractive index ratio is from 1.00 to 1.10, preferably 1.01 to 1.06 and more preferably 1.02 to 1.05 for a continuous set of wavelengths lying within a wavelength range of from about 100 nm to about 10 μm. According to another set of embodiments, these preferred refractive index ratios exist for a continuous set of wavelengths lying within a wavelength range of from about 300 nm to about 700 nm, and according to another set of embodiments, the ratio of refractive index of one to the other is at least 1.0 or is from 1.00 to 1.10, preferably 1.01 to 1.06 and more preferably 1.02 to 1.05 for a continuous set of wavelengths lying within a wavelength range of from about 400 nm to 50 μm. These dielectric structures, exhibiting a band gap in their dispersion relation, cannot support electromagnetic waves at certain frequencies thus those waves are inhibited from propagating through the material.

The polymeric structure should be made of material that, in a disarranged state (not arranged with the periodic structure necessary for photonic band gap properties) is at least partially transparent to the electromagnetic radiation of interest. When the material is at least partially transparent to the electromagnetic radiation of interest, defects in the ordered domain structure of the photonic band gap material define pathways through which the electromagnetic radiation can pass since the criteria for blocking the radiation is destroyed.

In certain compositions, one or more of the blocks or segments is crystalline or semicrystalline. This crystallinity is one distinguishing feature of the inventive interpolymers compared to materials of the prior art that have been used as photonic materials. This crystallinity provides a mechanism whereby the photonic behavior can be reversibly turned on or off, particularly when one block or segment is crystalline and the other block type is amorphous. For example, the refractive index of molten semicrystalline polyethylene is the same as that of an amorphous ethylene/1-octene interpolymer. Such materials can be heated above their melting temperature, where they lose the refractive index contrast necessary to exhibit characteristics of a photonic crystal. However, upon cooling, the semicrystalline material crystallizes and restores the refractive index contrast and resulting photonic properties.

Size of the domains is another important parameter affecting the photonic properties of the material. Domain size can be varied by selecting the relative molecular weights and compositions of the various blocks. Additionally, a diluent (compatible solvent, homopolymer, etc.) can be used to selectively swell an individual type of domain.

In some embodiments, the long range order and orientation of the domains can be affected by processing techniques. One such processing technique involves treating a homogeneously mixed spun cast film by bringing it above the highest glass transition temperature ($T_g$) or melting temperature ($T_m$) of the components for a time sufficient to produce the desired ordered phase separation morphology. The resulting morphology will take the form of the components separating into mesodomains with shapes that, for example, can be cylindrical or rodlike, spherical, bicontinuous cubic, lamellar or otherwise. The film may be brought above the $T_g$ or $T_m$ of the components by heating or, for example, by the use of a solvent which lowers the transition temperature of the components below the room or ambient temperature of the operating environment. Prior to treating, the copolymer will be in a thermodynamically unstable single phase which, when brought above the $T_g$ or $T_m$ of its components will separate into the mesodomains. In certain instances, the phase separation in AB block copolymers will yield stacked lamella consisting of alternating A and B slabs or layers with different refractive indices. In addition, if such copolymers are roll cast from solution, then well ordered, globally oriented mesodomains can be formed. Other known methods of globally orienting lamellar films are the use of surface-induced ordering, mechanical, such as shear, alignment, biaxial orientation, and electric field or magnetic field alignment.

Other embodiments of the invention do not require spin or roll casting to achieve the desired ordered structure. For example, simple compression molding of the inventive polymers can provide a film that displays photonic properties, thus providing a tremendous advantage in terms of processing costs. Other typical melt processing techniques, such as injection molding, blown or cast film processing, profile extrusion, drawn or blown fiber formation, calendaring and other conventional polymer melt processing techniques, may be used to achieve similar affects.

Some examples of the films exhibit iridescence and changing colors as the angle of incident light on the film is changed.

The inventive block interpolymers can also be fabricated to form mechanochromic films. A mechanochromic film is a material which responds to deformation by changing color. In these materials, the wavelength reflected changes reversibly with the applied strain due to the change in optical thickness. As the film is stretched, the change in the thickness of the layers causes the film to reflect different wavelengths of light. As the film is relaxed, the layers return to their original thickness and reflect their original wavelengths. In some cases the reflectivity can be tailored from the visible through nearinfrared regimes with applied stress.

The inventive block interpolymers may also be used to form polymeric reflective bodies for infrared, visible, or ultraviolet light, as described in U.S. Pat. No. 3,711,176, which is herein incorporated by reference. This patent describes materials that are formed by extrusion of multiple polymeric materials to create ordered layered structures with layers on the 50-1000 nm scale. The inventive interpolymers are advantaged over these materials because they do not require the expensive and tedious processing techniques, namely microlayer extrusion, to form the reflective bodies.

The optical interference films of the inventive block interpolymers may also be useful in a variety of optical applications such as Fresnel lenses, light pipes, diffusers, polarizers, thermal mirrors, diffraction gratings, band-pass filters, optical switches, optical filters, photonic bandgap fibers, optical waveguides, omnidirectional reflectors, brightness-enhancement filters, and the like.

The transparent elastomeric optical interference films of the present invention have a number of uses. Such materials can be used in window films, lighting applications, pressure sensors, privacy filters, eye protection, colored displays, UV-protective tapes, greenhouse films, packaging, toys and novelty items, decorative, and security applications. For example, the films may be used for packaging which display changing color patterns. The wrapping of irregular shaped items will cause the films to stretch in a variety of ways and exhibit unique color patterns. Toy or novelty items which change colors when stretched, such as balloons or embossed patterns are also possible. Pulsating signs or advertisements may be fabricated in which selective stretching of portions of the film by an inflation/deflation mechanism causes a pulsating color change effect.

The optical interference films of the present invention may also find use as solar screens which reflect infrared light. In films with varying thickness of the domains, the film can be made to reflect a broad band width of light. Because of the elasticity of the films, the infrared reflecting characteristics of the film may be changed by stretching the films. Thus, depending upon the desired characteristics, the film can be made to reflect infrared during certain times of the day, and then be stretched to appear transparent to visible light. Even when stretched, the film will continue to reflect ultraviolet wavelengths.

The elastomeric films of the present invention may also be used as adjustable light filters in photography by stretching the film to cause it to reflect different wavelengths of light. The films of the present invention may also find use in agriculture. As it is known that plant growth is influenced by the wavelength of light received by the plant, a greenhouse film may be formed that varies the transmitted wavelengths of light desired. Further, if transmission of a specific wavelength of light is desired as the angle of incidence of sunlight changes during the day, the film may be adjusted by stretching or relaxing it to maintain a constant transmitted wavelength.

The films of the present invention may also be used as pressure sensors to detect pressure changes and exhibit a color change in response thereto. For example, the film of the present invention may be fabricated into a diaphragm or affixed to another rubbery surface such as that of a tire to act as a pressure or inflation sensor. Thus, an elastomeric film sensor may be provided which, for example, reflects red when an under-inflated condition is encountered, green when there is a correct pressure, and blue when there exists an over-inflated condition.

Elastomeric films of the present invention may also find use as strain gauges or stress coatings. A film of the present invention may be laminated to the surface of a structure, and then exposed to a load. Deformation of the surface may then be measured precisely using a spectrophotometer which measures the change in wavelength of light reflected from the film. Extremely large surface areas may be covered with the film of the present invention.

Elastomeric films of the present invention are useful in colored displays, such as described in U.S. Pat. No. 7,138,173, which is incorporated herein in its entirety by reference. Such displays are frequently used as a means to display information in an eye-catching manner, or to draw attention to a specific article on display or for sale. These displays are often used in signage (e.g., outdoor billboards and street signs), in kiosks, and on a wide variety of packaging materials. It is particularly advantageous if a display can be made to change color as a function of viewing angle. Such displays, known as "color shifting displays", are noticeable even when viewed peripherally, and serve to direct the viewer's attention to the object on display.

Backlit displays having a variety of optical arrangements may be made using the films of the present invention. The actual device need not necessarily be a display, but could be a luminaire or a light source which uses the combination of film spectral-angular properties and wavelength emission from a lamp to create a desired light distribution pattern. This recycling, coupled with the high reflectivity of the films, produces a much brighter color display than is seen with conventional displays.

The films of the present invention may be used in conjunction with a distributed light source or several point sources, just as conventional backlights are now used for advertising signs or computer backlights. A flat reflective film, uniformly colored by optical interference, which covers the open face of a backlight will change color as the viewer passes by the sign. Opaque or translucent lettering of a chosen dyed or pigmented color can be applied to the reflective cover film via laser or screen printing techniques. Alternatively, interference reflective lettering composed of a different colored reflective film than the cover film can also be applied over cutouts made in the cover film, with the lettering displaying the opposite change in color from the cover film, e.g., cover film displays a green to magenta change with angle, while the lettering shows a magenta to green change over the same angles. Many other color combinations are possible as well.

The color changes in the cover film can also be used to "reveal" lettering, messages, or even objects that are not visible through the film at large angles of incidence, but become highly visible when viewed at normal incidence, or vice-versa. This "reveal" effect can be accomplished using specific color emitting lights in the backlight, or by dyed colored lettering or objects under the reflective cover film.

The brightness of the display can be enhanced by lining the inside of the backlight cavity with highly reflective interference film. In this same manner, the overall color balance of the display can be controlled by lining a low reflectance cavity with a reflective film that preferentially reflects only certain colors. The brightness of the chosen color may suffer in this case because of its transmission at certain angles through the lining. If this is undesirable, the desired color balance can be effected by coating a broadband liner film with a dye of the appropriate color and absorbance.

The reflective colored film may also be used in combination with dyed or pigment colored films with the latter on the viewer side to achieve a desired color control such as, e.g., eliminating a color shift on the lettering while producing a color shifting background.

The backlit sign need not be planar, and the colored film could be applied to more than one face of the sign, such as an illuminated cube, or a two sided advertising display.

The films of the present invention may also be used to create a variety of non-backlit displays. In these displays, at least one polarization of light from an external light source, which may be sunlight, ambient lighting, or a dedicated light source, is made to pass through the interference film twice before the transmission spectrum is seen by the viewer. In most applications, this is accomplished by using the interference film in combination with a reflective or polarizing surface. Such a surface may be, for example, a conventional mirror of the type formed through deposition of metals, a polished metal or dielectric substrate, or a polymeric mirror or polarizing film.

While the interference films of the present invention may be used advantageously in combination with either specularly reflective or diffusely reflective surfaces, a diffusely reflecting substrate is preferred. Such a substrate causes the colors transmitted by the film (and subsequently reflected by the substrate) to be directed out of the plane of incidence, or at a different angle of reflection in the plane of incidence, than the colored light that is specularly reflected by the film thereby allowing the viewer to discriminate between the transmitted and reflected colors. Diffuse white surfaces, such as card stock or surfaces treated with a diffusely reflective white paint, are especially advantageous in that they will create a display that changes color with angle.

In other embodiments, the diffuse surface, or portions thereof, may themselves be colored. For example, a diffuse surface containing ink characters may be laminated with a interference film that has at least one optical stack tuned to reflect light over the same region of the spectrum over which the ink absorbs. The characters in the resulting article will then be invisible at certain angles of viewing but clearly visible at other angles (a similar technique may be used for backlit displays by matching the reflective bandwidth of the interference film to the absorption band of the ink). In still other embodiments, the interference film itself can be printed on with a diffuse white or colored ink, which may be either opaque or translucent. Translucent is defined in this context as meaning substantially transmissive with a substantial diffusing effect. Alternatively, the interference film can be laminated to a white or colored surface, which can itself also be printed on.

In still other embodiments, the films of the invention may be used in combination with a substrate that absorbs the wavelengths transmitted by the film, thereby allowing the color of the display to be controlled solely by the reflectivity spectrum of the film. Such an effect is observed, for example, when a colored mirror film of the present invention, which transmits certain wavelengths in the visible region of the spectrum and reflects other wavelengths in the visible region, is used in combination with a black substrate.

The optical films and devices of the present invention are suitable for use in fenestrations, such as skylights or privacy windows. In such applications, the optical films of the present invention may be used in conjunction with, or as components in, conventional glazing materials such as plastic or glass. Glazing materials prepared in this manner can be made to be polarization specific, so that the fenestration is essentially transparent to a first polarization of light but substantially reflects a second polarization of light, thereby eliminating or reducing glare. The physical properties of the optical films can also be modified as taught herein so that the glazing materials will reflect light of one or both polarizations within a certain region of the spectrum (e.g., the UV region), while transmitting light of one or both polarizations in another region (e.g., the visible region). This is particularly important in greenhouse applications, where reflection and transmission of specific wavelengths can be utilized to control plant growth, flowering, and other biological processes.

The optical films of the present invention may also be used to provide decorative fenestrations which transmit light of specific wavelengths. Such fenestrations may be used, for example, to impart a specific color or colors to a room (e.g., blue or gold), or may be used to accent the decor thereof, as through the use of wavelength specific lighting panels.

The optical films of the present invention may be incorporated into glazing materials in various manners as are known to the art, as through coating or extrusion. Thus, in one embodiment, the optical films are adhered to all, or a portion, of the outside surface of a glazing material, for example, by lamination with the use of an optical adhesive. In another embodiment, the optical films of the present invention are sandwiched between two panes of glass or plastic, and the resulting composite is incorporated into a fenestration. Of course, the optical film may be given any additional layers or coatings (e.g., UV absorbing layers, antifogging layers, or antireflective layers) to render it more suitable for the specific application to which it is directed.

One particularly advantageous use of the colored films of the present invention in fenestrations is their application to sunlit windows, where reversible coloring is observed for day vs. night. During the day, the color of such a window is dictated primarily by the transmissive properties of the film toward sunlight. At night, however, very little light is seen in transmission through the films, and the color of the films is then determined by the reflectivity of the film toward the light sources used to illuminate the room. For light sources which simulate daylight, the result is the complimentary color of the film appearance during the day.

The films of the present invention may be used in various light fixture applications, including the backlit and non-backlit displays described earlier. Depending on the desired application, the film may be uniformly colored or iridescent in appearance, and the spectral selectivity can be altered to transmit or reflect over the desired wavelength range. Furthermore, the film can be made to reflect or transmit light of only one polarization for polarized lighting applications such as polarized office task lights or polarized displays incorporating light recycling to increase brightness, or the film can be made to transmit or reflect both polarizations of light when used in applications where colored mirrors or filters are desirable.

In the simplest case, the film of the present invention is used as a filter in a backlit light fixture. A typical fixture contains a housing with a light source and may include a diffuse or specular reflective element behind the light source or covering at least some of the interior surfaces of the optical cavity. The output of the light fixture typically contains a filter or diffusing element that obscures the light source from direct viewing. Depending upon the particular application to which the light fixture is directed, the light source may be a fluorescent lamp, an incandescent lamp, a solid-state or electroluminescent (EL) light source, a metal halide lamp, or even solar illumination, the latter being transmitted to the optical cavity by free space propagation, a lens system, a light pipe, a polarization preserving light guide, or by other means as are known to the art. The source may be diffuse or specular, and may include a randomizing, depolarizing surface used in combination with a point light source. The elements of the light fixture may be arranged in various configurations and may be placed within a housing as dictated by aesthetic and/or functional considerations. Such fixtures are common in architectural lighting, stage lighting, outdoor lighting, backlit displays and signs, and automotive dashboards. The film of the present invention provides the advantage that the appearance of the output of the lighting fixture changes with angle.

The color shifting films of the present invention are particularly advantageous when used in directional lighting. High efficiency lamps, such as sodium vapor lamps commonly used in street or yard lighting applications, typically have spectral emissions at only one major wavelength. When such a source which emits over a narrow band is combined with the film of the present invention, highly directional control of the emitted light can be achieved. For example, when the inventive film is made with a narrow passband which coincides with the emission peak of the lamp, then the lamp emission can pass through the film only at angles near the design angle; at other angles, the light emitted from the source is returned to the lamp, or lamp housing. Typical monochromatic and polychromatic spikey light sources include low pressure sodium lamps, mercury lamps, fluorescent lamps, compact fluorescent lamps, and cold cathode fluorescent lamps. Additionally, the reflecting film need not necessarily be of a narrow pass type since, with monochromatic sources, it may only be necessary to block or pass the single wavelength emission at a specific angle of incidence. This means that a reflective film having, for example, a square wave reflection spectrum which cuts on or off at a wavelength near that of the lamp emission can be used as well. Some specific geometries in which the light source and film of the present invention can be combined include, but are not limited to, the following:

(a) A cylindrical bulb, such as a fluorescent tube, is wrapped with film designed for normal incidence transmission of the bulb's peak emitted radiation, i.e., the film is designed with a passband centered at the wavelength of the lamp emission. In this geometry, light of the peak wavelength is emitted mainly in a radial direction from the bulb's long axis.

(b) An arbitrary bulb geometry in a reflective lamp housing can be made to radiate in a direction normal to the plane of the housing opening by covering the opening with a film selected to transmit at the bulb's peak emitted radiation. The opening can face downward or in any other direction, and the light will be viewable at angles in a direction normal to the plane of the opening but not at angles of incidence substantially away from normal.

(c) Alternately, the combination described in (b) can use a film that is designed to transmit the lamp emission at one or more angles of incidence away from the normal angle by providing one or more appropriate passbands, measured at normal incidence, at wavelengths greater than the lamp emission wavelength. In this way, the lamp emission is transmitted at angles where the blue shift of the passband is sufficient to align the emission peak with the passband.

(d) Combining the angular distribution film described in (c) with the geometry described in (a) will give a cylindrical bulb in which one can have direction control of the emitted light in a plane parallel to the long axis of the bulb.

(e) A polychromatic spikey light source, for example, one having emission spikes at three different wavelengths, can be combined with an inventive film having only one passband, and such that the film transmits only one of the three color spikes at a given angle of incidence and each emission peak is transmitted at a different angle. Such a film can be made using multiple groups of layers, each of which reflect at different wavelength regions, or it can be made using one group of layers and their higher order harmonics. The width of the first order bandwidth region and consequently the width of the harmonic bandwidths, can be controlled to give desired transmission gaps between the first order and harmonic reflection bands. The combination of this film with the polychromatic spikey light source would appear to split light from an apparently "white" light source into its separate colors.

Since the rate of spectral shift with angle is small near normal incidence, the angular control of light is less effective at normal incidence compared to high angles of incidence on the inventive film. For example, depending on the width of the lamp emission lines, and the bandwidth of the passband, the minimum angular control may be as small as +/−10 degrees about the normal, or as great as +/−20 degrees or +/−30 degrees. Of course, for single line emitting lamps, there is no maximum angle control limit. It may be desirable, for either aesthetic or energy conservation reasons, to limit the angular distribution to angles less than the free space available to the lamp, which is typically +/−90 degrees in one or both of the horizontal and vertical planes. For example, depending on customer requirements, one may wish to reduce the angular range to +/−45, +/−60 or only +/−75 degrees. At high angles of incidence, such as 45 degrees or 60 degrees to the normal of the film, angular control is much more effective. In other words, at these angles, the passband shifts to the blue at a higher rate of nm/degree than it does at normal incidence. Thus, at these angles, angular control of a narrow emission peak can be maintained to within a few degrees, such as +/−5 degrees, or for very narrow passbands and narrow emission lines, to as small as +/−2 degrees.

The films of the present invention can also be shaped in a pre-designed fashion to control the angular out put of the lamp in the desired pattern. For example, all or part of the film placed near the light source may be shaped to corrugated or triangular waveforms, such that the axis of the waveform is either parallel or perpendicular to the axis of the lamp tube. Directional control of different angles in orthogonal planes is possible with such configurations.

While the combination of a narrow band source and an inventive film works well to control the angle at which light is emitted or detected, there are only a limited number of sources with narrow emission spectra and therefore limited color options available. Alternately, a broadband source can be made to act like a narrow band source to achieve similar directional control of the emitted light. A broadband source can be covered by a color selective film that transmits in certain narrow band wavelength regions, and that modified source can then be used in combination with a second film having the same transmission spectrum so that the light emitted from the source/color selective film combination can again pass through the inventive film only at the design angle. This arrangement will work for more than one color, such as with a three color red-green-blue system. By proper selection of the films, the emitted colors will be transmitted at the desired angle. At other angles, the emitted wavelengths will not match every or any passband, and the light source will appear dark or a different color. Since the color shifting films can be adapted to transmit over a broad range of wavelengths, one can obtain virtually any color and control the angular direction over which the emitted light is observed.

Direction dependent light sources have utility in many applications. For example, the light sources of the present invention can be used for illuminating automobile instrument panels so that the driver, who is viewing the instruments at a normal angle, can view the transmitted light, but the light would not be reflected off the windshield or viewable by a passenger because they would be at off angles to the instruments. Similarly, illuminated signs or targets can be constructed using the direction dependent light sources of the present invention so that they can be perceived only at certain angles, for example, normal to the target or sign, but not at other angles. Alternately, the film can be designed so that light of one color is transmitted at one angle, but a different color is detectable at another angle. This would be useful, for example, in directing the approach and stopping point for vehicles, such as for a carwash or emission check station. The combination of inventive film and light source can be selected so that, as a vehicle approached the illuminated sign and the driver was viewing the film at non-normal angles to the sign, only green light would be visible, but the perceived transmitted light would shift to red at the angle where the vehicle was to stop, for example, normal to the sign. The combination of the inventive film and a narrow band source is also useful as a security device, wherein the film is used as a security laminate, and a light source wrapped with the same film is used as a simple verification device. Other examples of the direction dependent light source of the present invention are described in more detail in the following examples.

Spectrally selective films and other optical bodies can be made in accordance with the teachings of the present invention which are ideally suited for applications such as horticulture. A primary concern for the growth of plants in greenhouse environments and agricultural applications is that of adequate levels and wavelengths of light appropriate for plant growth. Insufficient or uneven illumination can result in uneven growth or underdeveloped plants. Light levels that are too high can excessively heat the soil and damage plants. Managing the heat generated by ambient solar light is a common problem, especially in southern climates.

The spectrally selective color films and optical bodies of the present invention can be used in many horticultural applications where it is desired to filter out or transmit specific wavelengths of light that are optimal for controlled plant growth. For example, a film can be optimized to filter out heat producing infrared and non-efficient visible solar wavelengths in order to deliver the most efficient wavelengths used in photosynthesis to speed plant growth and to manage soil and ambient temperatures.

It is known that plants respond to different wavelengths during different parts of their growth cycle, as shown in FIG. 35. Throughout the growth cycle, the wavelengths in the 500-580 nm range are largely inefficient, while wavelengths in the 400-500 nm and 580-800 nm ranges illicit a growth response. Similarly, plants are insensitive to IR wavelengths past about 800 nm, which comprise a significant part of solar emission, so removal of these wavelengths from the solar spectrum can significantly reduce heating and allow for concentration of additional light at wavelengths useful for plant growth.

Commercial lamps used in greenhouses are effective in accelerating photosynthesis and other photoresponses of plants. Such lamps are most commonly used as supplements to natural, unfiltered solar light. Lamps that emit energy in the blue (about 400-500 nm), red (about 600-700 nm), or near IR (about 700-800 nm) are used in accelerating growth. One common commercial grow-lamp has its emission maxima at 450 and 660 nm, with little emission of wavelengths beyond 700 nm. Another common source has high emission in the blue and red, and high emission in the near IR wavelengths. Lamps which emit wavelengths in the range of 500-580 nm are referred to as "safe lights" because their emission is in a low response region and does not significantly affect plant growth, either beneficially or detrimentally.

Light sources used in general lighting are often paired to accomplish similar results to the "grow lights". The output wavelengths from some sources actually retard growth, but this can be compensated for by pairing with other sources. For example, low pressure sodium used alone can inhibit synthesis of chlorophyll but when the low pressure sodium is combined with fluorescent or incandescent lamps, normal photosynthesis occurs. Examples of common pairings of commercial lights used in greenhouses include (i) high pressure sodium and metal halide lamps; (ii) high pressure sodium and mercury lamps; (iii) low pressure sodium and fluorescent and incandescent lamps; and (iv) metal halide and incandescent lamps.

In a greenhouse environment, the color selective films and optical bodies of the present invention, when used alone as color filters or in combination with reflective backings, are useful for concentrating light of the desired wavelengths for optimal plant growth. The films and optical bodies may be used with normal unfiltered solar light, or they may be combined with artificial broadband light sources to control the wavelength of light emitted from the source.

Such light sources include, but are not limited to, incandescent lamps, fluorescent lamps such as hot or cold cathode lamps, metal halide lamps, mercury vapor lamps, high and low pressure sodium lamps, solid-state or electroluminescent (EL) lights, or natural or filtered solar light that is optically coupled to the color selective film. Several filtration/concentration systems will be described in more detail that may be used to manage heat in the greenhouse environment, while delivering an increased amount of light at wavelengths optimized for photosynthesis and other plant photoresponses.

The interference films and optical bodies of the present invention can also be used with one or more direct or prefiltered artificial light sources so as to optimize the spectra afforded by these films even further. In some cases, it may be desirable to wrap or otherwise couple the interference film directly to the artificial source so that in effect the light source emits primarily the wavelengths desired for controlled plant growth. The film may also be laminated directly to the clear panels which make up the roof and/or walls of a typical greenhouse so that much of the light that enters the building is of the desired spectral composition, or else such panels may be extruded to include one or more color selective films within the panel itself. In order that all of the light entering the building would be of a precise wavelength range, it would be desirable to have the films mounted on a heliostat or other mechanism that moves to compensate for the angle of the sun's rays throughout the day. Simpler mechanisms such as south facing panels with only a weekly or monthly change in the angle from the horizontal or vertical can perform quite well also.

One or more reflectors can also be used to direct the filtered light to desired locations, and it is understood that various physical shapes of the deflector and/or interference film can be used to aim or spread light across desired portions of the room. In addition to these described modes of use, the film can be used as a filtered wrapping for individual plants, as a reflector placed between plants and soil either in film form or as slit or chopped mulch, or as reflectors and filters for use in aquarium lighting for aquatic plants.

In addition to the previously described spectrally selective films that can be tailored to transmit or reflect infrared and/or green light that is not useful for plant growth, a film designed to control the amount of red light, typically from about 660-680 nm, and the amount of far red light, typically from about 700-740 nm, is especially useful to control plant growth. It has been shown that the ratio of red to far red light should be maintained at a level of 1.1 or higher in order to reduce elongation and force plants to branch or propagate, resulting in thicker, denser plant growth. Additionally, by precisely controlling the red/far red ratio and the sequencing of wavelength exposure, many plants can be forced into a flowering state or held in the vegetative state. Some plant varieties can be controlled with as little as 1 minute of red or far red doping. Plant responses to red and far red light have been described in J. W. Braun, et al., "Distribution of Foliage and Fruit in Association with Light Microclimate in the Red Raspberry Canopy, 64(5) Journal of Horticultural Science 565-72 (1989) and in Theo J. Blow, "New Developments in Easter Lilly Height Control" (Hort. Re. Instit. Of Ontario, Vineland Station, Ont. LOR 2EO.

Previous attempts to control the red/far red ratio have utilized light blocking liquids that are pumped into the cavity between panes in greenhouse twin wall constructions. This has not been satisfactory because of the difficulty in adding and removing the liquid. Other attempts have been made to use colored film for the roof glazing, but it is difficult to control if the plant variety in the greenhouse changes frequently or if outdoor weather conditions change. The film of the present invention is ideally suited for this application. The red/far red ratio can be controlled by varying the thickness gradient or by changing the angle of the film to permit the desired wavelengths to reach the plants. To compensate for varying outdoor conditions or varying needs of different plant varieties, the film is preferably positioned within the greenhouse in such a way that it can be either used or stored, for example, by a rolling shade along the roof line which can be drawn down or rolled up, or by a shade cloth pulled horizontally above the plant height. Alternately, individual enclosures of the film can be constructed for separate plants or groups of plants.

The film of the present invention can also be used in conjunction with conventional mirrors to control the intensity of any desired portion of the sunlight spectrum that reaches the plants. Generally, it is desirable to expose plants to a constant level of the wavelengths and intensity of light useful for plant growth throughout the entire day. On a typical sunny day, however, the light level peaks at about noon, and this light level may be excessive for many plants; the leaf temperature often rises, which decreases the plant efficiency. It is preferable to reduce the level of light reaching the plant during mid-day to provide a more uniform level throughout the day. For example, roses flower most efficiently when exposed to a maximum light level of 600 $\mu$mol/sec-m$^2$, and this level is often achieved by 11:00 am during the winter months at a latitude of 45 degrees. Reducing the light level between 11:00 and 1:00 improves the plant yield. The combined usage of conventional minors with our wavelength selective films can be used to change the intensity of light directed to plants during different hours of the day. For example, the use of a visible mirror can be discontinued during the hours of highest solar incidence by redirecting its angle of reflection to reject that portion of light from the sun. Other combinations of baffles and curtains can also be used with our wavelength selective films to control the intensity of light.

Counterfeiting and forgery of documents and components, and the illegal diversion of controlled materials such as explosives, is a serious and pervasive problem. For example, commercial aircraft maintenance crews regularly encounter suspected counterfeit parts, but lack a reliable means to distinguish between high-grade parts and counterfeit parts that are marked as meeting specifications. Similarly, it is reported that up to ten percent of all laser printer cartridges that are sold as new are actually refurbished cartridges that have been repackaged and represented as new. Identification and tracking of bulk items such as ammonium nitrate fertilizer usable in explosives is also highly desirable, but current means of identification are prohibitively expensive.

Several means exist to verify the authenticity of an item, the integrity of packaging, or to trace the origin of parts, components, and raw materials. Some of these devices are ambient verifiable, some are verifiable with separate lights, instruments, etc., and some combine aspects of both. Examples of devices used for the verification of documents and package integrity include iridescent inks and pigments, special fibers and watermarks, magnetic inks and coatings, fine printings, holograms, and Confirm® imaged retroreflective sheeting available from 3M. Fewer options are available for authentication of components, mostly due to size, cost, and durability constraints. Proposed systems include magnetic films and integrated circuit chips.

Microtaggants have been used to trace controlled materials such as explosives. These materials are typically multilayer polymers that are ground up and dispersed into the product. The individual layers in the microtaggant can be decoded using an optical microscope to yield information pertaining to the date and location of manufacture. There has been a long unmet need for a security film product that is both ambient verifiable and machine readable, that is manufacturable but not easily duplicated, that is flexible and can be used on a variety of part sizes ranging from near microscopic to large sheets, and that may be coded with specific, machine-readable information.

The films and optical bodies of the present invention can be tailored to provide a security film or device useful as a backing, label, or overlaminate that meets all of these needs. The color shifting feature and high reflectivity and color saturation at oblique angles are properties that can be exploited to uniquely identify a document or package, and spectral detail can be designed into the films to provide unique spectral fingerprints that may be used to identify specific lots of security film to code individual applications. The security films and optical bodies can be tailored to reflect over any desired portion of the spectrum, including visible, infrared, or ultraviolet. When only covert identification is desired, a film can be made that appears transparent in the visible region of the spectrum but that has varying transmission and reflections bands in the infrared region to impart a covert spectral fingerprint.

Information can also be encoded in the security films and optical bodies of the present invention by several other methods, either alone or in combination with the above described methods of varying the intensity and position of transmission and reflection bands. For example, individual layers may be tuned to the infrared portion of the spectrum, and overtones in the visible region can be controlled to produce unique spectra.

The spectrally selective security films and optical bodies of the present invention may also include relatively thick layers either within the optical stack or adjacent to the optical stack, and these layers may also be used to impart information that can be decoded by optical inspection of a cross-section of the film. The films may also be combined with colored printing or graphics printed on a substrate below the film to provide indicia that may be hidden or viewable depending on the angle of observation. Color contrast may be achieved by thinning the optical layers locally. Within this affected region, a new color that also color shifts is evident against the unaffected region. To affect a localized thinning of layers, the preferred method is embossing at temperatures above the glass transition temperatures of all of the polymers in the film and/or with suitable pressure. Localized thinning of layers could also be achieved by bombardment with high energy particles, ultrasonics, thermoforming, laser pulsing and stretching. As with the other color selective films already described, the security film may incorporate a hardcoat, an antireflective surface, or an absorbing coating to improve durability and contrast. The security films may also incorporate a heat activated or pressure sensitive adhesive to function as a label or die-cut.

For most applications, the security films or other optical bodies of the present invention can be appropriately sized and laminated directly to a document or packaging material. The spectral features of these films are typically very narrow to reflect the minimum amount of light. While the spectral features of the film will typically be limited to the infrared so as not to occlude the document or package, the character and color of the film may also be used to enhance the appearance of the article.

For some applications, the security film may be used in a bulk material by grinding the film into a powder and dispersing the powder into the material. Paints, coatings and inks can be formulated from ground up platelets utilizing the films of this invention. In cases where the bulk material may be an explosive, it may be desirable to avoid using oriented material if substantial relaxation would occur during an explosion. Optionally, the powder may be coated with an ablative material such as an acrylate to absorb energy during an explosive event.

The security films and optical bodies of the present invention may be read by a combination of ambient verification (for example, the presence of a colored, reflective film on an article, possibly combined with identifiable performance at non-normal angles) and instrument verification. A simple machine reader may be constructed using a spectrophotometer. Several low cost spectrophotometers based on CCD detector arrays are available which meet the needs of this invention; preferably, these include a sensor head connected to the spectrophotometer with a fiber optic cable. The spectrophotometer is used to determine the spectral code of the film by measuring light incident on the article at a predetermined angle or angles, which can be normal to the film at oblique angles, or a combination of both.

In addition to exploiting the optical properties of the films of the present invention for security applications, the mechanical properties of these films can also be utilized. Thus, for example, the films of the present invention can be intentionally designed to have low resistance to interlayer delamination, thereby providing anti-tampering capabilities.

As noted elsewhere herein, the color shifting properties of the films of the present invention may be used advantageously in numerous decorative applications. Thus, for example, the films of the present invention may be used, either alone or in combination with other materials, films, substrates, coatings, or treatments, to make wrapping paper, gift paper, gift bags, ribbons, bows, flowers, and other decorative articles. In these applications, the film may be used as is or may be wrinkled, cut, embossed, converted into glitter, or otherwise treated to produce a desired optical effect or to give the film volume.

The optical interference film of the present invention may also optionally include a skin layer on one or both major surfaces of the film. The skin layer comprises a blend of a substantially transparent elastomeric polymeric material with a substantially transparent, nonelastomeric polymeric material having substantially the same index of refraction as the elastomeric polymer. Optionally, the elastomeric polymeric material in the skin layer may be one of the elastomers which makes up the alternating layer of the optical interference film. In preferred examples, the skin layer retains elastomeric characteristics and transparency while providing the film with a protective surface which is nonblocking. The skin layer also remains receptive to lamination of the film to other surfaces as well as receptive to inks or other forms of printing.

The inventive block interpolymers can also be used to form films with improved barrier properties. Such materials can be used to form, for example, bladders in athletic shoes. These materials have particular advantages for barrier films, in which the barrier is improved because the layers physically increase the time to equilibrium saturation of penetrants. Some embodiments including semi-crystalline domains or layers with long range order may show decreases in the permeability of small molecules such as oxygen and water relative to similar polymeric materials. Such properties may make these inventive copolymers valuable in protective packaging of food and other moisture and air sensitive materials. The inventive block interpolymers can also display increased flex crack resistance compared to multilayer films.

Microporous Films

The inventive copolymers can also be used to form microporous polymeric films, which have use in many applications such as clothing, shoes, filters, and battery separators, as described in US 20080269366, which is herein incorporated by reference for purposes of US patent practice.

In particular, such films may be useful in membrane filters. These filters are generally thin, polymeric films having a large number of microscopic pores. Membrane filters may be used in filtering suspended matter out of liquids or gases or for quantitative separation. Examples of different types of membrane filters include gas separation membranes, dialysis/hemodialysis membranes, reverse osmosis membranes, ultrafiltration membranes, and microporous membranes. Areas in which these types of membranes may be applicable include analytical applications, beverages, chemicals, electronics, environmental applications, and pharmaceuticals.

In addition, microporous polymeric films may be used as battery separators because of their ease of manufacture, chemical inertness and thermal properties. The principal role of a separator is to allow ions to pass between the electrodes but prevent the electrodes from contacting. Hence, the films must be strong to prevent puncture. Also, in lithium-ion batteries the films should shut-down (stop ionic conduction) at certain temperatures to prevent thermal runaway of the battery. Ideally, the resins used for the separator should have high strength over a large temperature window to allow for either thinner separators or more porous separators. Also, for lithium ion batteries lower shut-down temperatures are desired however the film must maintain mechanical integrity after shut-down. Additionally, it is desirable that the film maintain dimensional stability at elevated temperatures The microporous films of the present invention may be used in any of the processes or applications as described in, but not limited to, the following patents and patent publications, all of which are herein incorporated by reference for purposes of US patent practice: WO2005/001956A2; WO2003/100954A2; U.S. Pat. No. 6,586,138; U.S. Pat. No. 6,524,742; US 2006/0188786; US 2006/0177643; U.S. Pat. No. 6,749,k961; U.S. Pat. No. 6,372,379 and WO 2000/34384A1.

The mesophase separated structure provided by the inventive copolymers provide several improvements over the prior art for forming microporous polymeric films. The ordered morphologies result in a greater degree of control over the pore size and channel structure. The phase separated melt morphology also limits film shrinkage in the melt and therefore imparts a greater dimensional melt stability than in non-phase separated materials.

Photonic Paper, Organic Sensors, Polymerized Composites, Etc.

Interactions of the inventive materials with certain small molecules results in swelling of one or both of the domains. This swelling produces visible color changes that can be useful in applications such as chemical sensors.

With molecules having low vapor pressures, the swelling is reversible upon evaporation. This feature can be used to create films that act as photonic paper, enabling a reusable paper or recording media requiring no pigment for color display as described for a colloidal photonic system in *Advanced Materials* 2003, 15, 892-896.

In other cases, the swelling can be accomplished with a material that can be fixed after swelling to make a stable composite material. Suitable swelling agents can include polymerizable monomers to create polymer composites (for an example of colloidal composite systems, see: *Advanced Materials* 2005, 17, 179-184) or metal precursors to create hybrid organic/inorganic materials.

In some embodiments of the invention, the amorphous nature of the soft domains makes them generally more amenable to swelling than the semicrystalline hard domains. This selective swelling provides a means for selective chemical modification of the soft domains, which can impart differentiated properties.

Distributed Feedback Lasers

The inventive polymers can also be used as a component in a distributed feedback laser. A distributed feedback laser is a type of laser diode, quantum cascade laser or optical fiber laser where the active region of the device is structured as a diffraction grating. The grating, known as a distributed Bragg reflector, provides optical feedback for the laser during distributed Bragg scattering from the structure. The inventive polymers could serve as the distributed Bragg reflector. The inventive materials can also be incorporated into a dynamically tunable thin film laser as described in WO2008054363, which is herein incorporated by reference for purposes of US patent practice.

The preceding description of the present invention is not intended to be limited to films and may also be present in other articles or objects.

Fibers that may be prepared from the inventive polymers or blends include, but are not limited to, staple fibers, tow, multicomponent, sheath/core, twisted, and monofilament. Suitable fiber forming processes include spinbonded, melt blown techniques, as disclosed in U.S. Pat. Nos. 4,430,563, 4,663, 220, 4,668,566, and 4,322,027, gel spun fibers as disclosed in U.S. Pat. No. 4,413,110, woven and nonwoven fabrics, as disclosed in U.S. Pat. No. 3,485,706, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The new polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing. Fibers made from the copolymers may also exhibit optical properties attractive in fabrics and textiles, such as reflective or color-changing characteristics.

Dispersions, both aqueous and non-aqueous, can also be formed using the inventive polymers or formulations comprising the same. Frothed foams comprising the invented polymers can also be formed, as disclosed in PCT application No. PCT/US2004/027593, filed Aug. 25, 2004, and published as WO2005/021622. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Additives and adjuvants may be included in any formulation comprising the inventive polymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthenic oils; and other natural and synthetic polymers, including other polymers according to embodiments of the invention.

Suitable polymers for blending with the polymers according to embodiments of the invention include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341), ethylene-vinyl acetate (EVA), ethylene/vinyl alcohol copolymers, polystyrene, impact modified polystyrene, acrylonitrile butadiene styrene (ABS), styrene/butadiene block copolymers and hydrogenated derivatives thereof (SBS and SEBS), polyisobutylene (PIB) homopolymer, PIB-isoprene copolymer, EPDM and thermoplastic polyurethanes. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil Chemical Company) can also be useful as components in blends comprising the inventive polymers.

Additional end uses include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

In some embodiments, thermoplastic compositions comprising a thermoplastic matrix polymer, especially isotactic polypropylene, and an elastomeric block interpolymer of butene and a copolymerizable comonomer according to embodiments of the invention, are uniquely capable of forming core-shell type particles having hard crystalline or semi-crystalline blocks in the form of a core surrounded by soft or elastomeric blocks forming a "shell" around the occluded domains of hard polymer. These particles are formed and dispersed within the matrix polymer by the forces incurred during melt compounding or blending. This highly desirable morphology is believed to result due to the unique physical properties of the block interpolymers which enable compatible polymer regions such as the matrix and higher comonomer content elastomeric regions of the block interpolymer to self-assemble in the melt due to thermodynamic forces. Shearing forces during compounding are believed to produce separated regions of matrix polymer encircled by elastomer. Upon solidifying, these regions become occluded elastomer particles encased in the polymer matrix.

Particularly desirable blends are thermoplastic polyolefin blends (TPO), thermoplastic elastomer blends (TPE), thermoplastic vulcanizates (TPV) and styrenic polymer blends. TPE and TPV blends may be prepared by combining the invented multi-block polymers, including functionalized or unsaturated derivatives thereof with an optional rubber, including conventional block copolymers, especially an SBS block copolymer, and optionally a crosslinking or vulcanizing agent. TPO blends are generally prepared by blending the invented block interpolymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779.

Suitable conventional block copolymers for this application desirably possess a Mooney viscosity (ML 1+4 @ 100° C.) in the range from 10 to 135, more preferably from 25 to 100, and most preferably from 30 to 80. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blends may be prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, calenders, and the like. The sequence of mixing and method may depend on the desired final composition. A combination of Banbury batch mixers and continuous mixers may also be employed, such as a Banbury mixer followed by a mill mixer followed by an extruder. Typically, a TPE or TPV composition will have a higher loading of cross-linkable polymer (typically the conventional block copolymer containing unsaturation) compared to TPO compositions. Generally, for TPE and TPV compositions, the weight ratio of conventional block copolymer to block interpolymer may be from about 90:10 to 10:90, more preferably from 80:20 to 20:80, and most preferably from 75:25 to 25:75. For TPO applications, the weight ratio of block interpolymer to polyolefin may be from about 49:51 to about 5:95, more preferably from 35:65 to about 10:90. For modified styrenic polymer applications, the weight ratio of block interpolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend that a person skilled in this art may consult if necessary.

Certain compositions of the inventive block copolymers also act as plasticizers. A plasticizer is generally an organic compound incorporated into a high molecular weight polymer, such as for example a thermoplastic, to facilitate processing, increase its workability, flexibility, and/or distensibility of the polymer. Polypropylene, for example, is an engineering thermoplastic that is generally stiff and even brittle below room temperature especially for highly stereoregular polypropylene.

Some embodiments of the invention provide miscible blends with polypropylene. By blending such interpolymer plasticizers with polypropylene (isotactic polypropylene, syndiotactic polypropylene and atactic polypropylene), the glass transition temperature, storage modulus and viscosity of the blended polypropylene are lowered. By decreasing the transition temperature, storage modulus and viscosity, the workability, flexibility, and distensibility of polypropylene improves. As such, broadened commercial application for these new polypropylene blends in film, fibers and molded products is apparent. Furthermore, the flexibility of a product design utilizing these novel blends can be further extended by taking advantage of the enhanced comonomer incorporation and tacticity control possible with metallocene and other homogeneous catalysts, both of which can reduce isotactic polypropylene crystallinity prior to blending with the inventive block interpolymer.

These plasticized polypropylene thermoplastics may be used in known applications for polypropylene compositions. These uses include, but are not limited to: hot melt adhesives; pressure sensitive adhesives (as an adhesive component, particularly when the polypropylene has low levels of crystallinity, e.g., amorphous polypropylene); films (whether extrusion coatings, cast or blown; such will exhibit improved heat sealing characteristics); sheets (such as by extrusion in single or multilayer sheets where at least one layer is a plasticized polypropylene thermoplastic composition of the invention); meltblown or spunbond fibers; and, as thermoplastic components in thermoformable thermoplastic olefin ("TPO") and thermoplastic elastomer ("TPE") blends where polypropylene has traditionally been demonstrated to be effective. In view of these many uses, with improved low temperature properties and increased workability, the plasticized polypropylene thermoplastics offer a suitable replacement in selected applications for plasticized polyvinyl chloride (PVC).

The blend compositions may contain processing oils, plasticizers, and processing aids. Rubber processing oils and paraffinic, napthenic or aromatic process oils are all suitable for use. Generally from about 0 to about 150 parts, more preferably about 0 to about 100 parts, and most preferably from about 0 to about 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV radiation, ozone, and oxidation, compared to mostly or highly saturated rubbers. In applications such as tires made from compositions containing higher concentrations of diene based rubbers, it is known to incorporate carbon black to improve rubber stability, along with anti-ozone additives and anti-oxidants. Block interpolymers according to the present invention possessing extremely low levels of unsaturation, find particular application as a protective surface layer (coated, coextruded or laminated) or weather resistant film adhered to articles formed from conventional diene elastomer modified polymeric compositions.

For conventional TPO, TPV, and TPE applications, carbon black is the additive of choice for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 cm$^3$/100 g. Generally, smaller particle sized carbon blacks are employed, to the extent cost considerations permit. For many such applications the present block interpolymers and blends thereof require little or no carbon black, thereby allowing considerable design freedom to include alternative pigments or no pigments at all. Multi-hued tires or tires matching the color of the vehicle are one possibility.

Compositions, including thermoplastic blends according to embodiments of the invention may also contain anti-ozonants or anti-oxidants that are known to a rubber chemist of ordinary skill The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic antioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051, 681.

For some compositions, additional mixing process may be employed to pre-disperse the anti-oxidants, anti-ozonants, carbon black, UV absorbers, and/or light stabilizers to form a masterbatch, and subsequently to form polymer blends there from.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643; 3,806,558; 5,051,478; 4,104,210; 4,130,535; 4,202,801; 4,271,049; 4,340,684; 4,250,273; 4,927,882; 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer", Vol. 74, No 3, July-August 2001.

When the block interpolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 percent.

The block interpolymers according to embodiments of the invention as well as blends thereof possess improved processability compared to prior art compositions, due, it is believed, to lower melt viscosity arising from the polydispersity of the inventive block interpolymer. Thus, the composition or blend demonstrates an improved surface appearance, especially when formed into a molded or extruded article. At the same time, the present compositions and blends thereof uniquely possess improved melt strength properties, thereby allowing the present block interpolymers and blends thereof, especially TPO blends, to be usefully employed in foam and thermoforming applications where melt strength is currently inadequate.

Thermoplastic compositions according to embodiments of the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane based or other coupling agents may also be employed for better filler bonding.

The thermoplastic compositions according to embodiments of the invention, including the foregoing blends, may be processed by conventional molding techniques such as injection molding, extrusion molding, thermoforming, slush molding, over molding, insert molding, blow molding, and other techniques. Films, including multi-layer films, may be produced by cast or tentering processes, including blown film processes.

TESTING METHODS

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

Polymer Fractionation by TREF

Large-scale TREF fractionation is carried by dissolving 15-20 g of polymer in 2 liters of 1,2,4-trichlorobenzene (TCB) by stiffing for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing. Additional information regarding this technique is taught by Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982).

DSC Standard Method

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 190° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 230° C. and held isothermal for 3 minutes in order to remove any previous thermal history. The sample is then cooled to −90° C. at 10° C./min cooling rate and held at −90° C. for 3 minutes. The sample is then heated to 230° C. at 10° C./min. heating rate. The cooling and second heating curves are recorded.

The DSC melting peak is measured as the maximum in heat flow rate (W/g) with respect to the linear baseline drawn between the beginning and end of melting. The heat of fusion is measured as the area under the melting curve between the beginning and the end of melting using a linear baseline. For polybutene homopolymers and copolymers, the beginning of melting is typically observed between 0 and −40° C. The resulting enthalpy curves are analyzed for peak melting temperature, onset, and peak crystallization temperatures, heat of fusion and heat of crystallization, and any other DSC analyses of interest.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent polybutene molecular weights are determined by using appropriate Mark-Houwink coefficients for polybutene (S. S. Stivala, R. J. Valles, D. W. Levi, J. Appl. Polym. Sci., 7, 97-102 (1963); and Th.G. Scholte, N. L. J. Meijerink, H. M. Schoffeleers, and A. M. G. Brands, J. Appl. Polym. Sci., 29, 3763-3782 (1984), incorporated herein by reference) and polystyrene (as described by E. P. Otocka, R. J. Roe, N. Y. Hellman, P. M. Muglia, Macromolecules, 4, 507 (1971) incorporated herein by reference) in the Mark-Houwink equation:

$$\{\theta\}=KM^a$$

where $K_{pp}=1.90\text{E-}04$, $a_{pp}=0.725$ and $K_{ps}=1.26\text{E-}04$, $a_{ps}=0.702$.

Polybutene equivalent molecular weight calculations are performed using Viscotek TriSEC software Version 3.0.

$^{13}$C NMR $^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example. The tacticity of polybutylene may need to be considered in the calculations.

The data is collected using a Varian UNITY Plus 400 MHz NMR spectrometer or a JEOL Eclipse 400 NMR Spectrometer, corresponding to a $^{13}$C resonance frequency of 100.4 or 100.5 MHz, respectively. Acquisition parameters are selected to ensure quantitative $^{13}$C data acquisition in the presence of the relaxation agent. The data is acquired using gated 1H decoupling, 4000 transients per data file, a 6 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun and periodic vortexing of the tube and contents.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers made with catalyst systems, such as the nonmetallocene, metal-centered, heteroaryl ligand catalyst (described above) the mr region is corrected for ethylene and regio-error by subtracting the contribution from PPQ and PPE. For these propylene-ethylene copolymers the rr region is corrected for ethylene and regio-error by subtracting the contribution from PQE and EPE. For copolymers with other monomers that produce peaks in the regions of mm, mr, and rr, the integrals for these regions are similarly corrected by subtracting the interfering peaks using standard NMR techniques, once the peaks have been identified. This can be accomplished, for example, by analyzing a series of copolymers of various levels of monomer incorporation, by literature assignments, by isotopic labeling, or other means which are known in the art.

For copolymers made using a nonmetallocene, metal-centered, heteroaryl ligand catalyst, such as described in U.S. Patent Publication NO. 2003/0204017, the $^{13}$C NMR peaks corresponding to a regio-error at about 14.6 and about 15.7 ppm are believed to be the result of stereoselective 2,1-insertion errors of propylene units into the growing polymer chain. In general, for a given comonomer content, higher levels of regio-errors lead to a lowering of the melting point and the modulus of the polymer, while lower levels lead to a higher melting point and a higher modulus of the polymer.

Matrix Method Calculation

As an example of determination of comonomer compositions, the following procedure can be used to determine the comonomer composition and sequence distribution for propylene/ethylene copolymers. Integral areas are determined from the $^{13}$C NMR spectrum and input into the matrix calculation to determine the mole fraction of each triad sequence. The matrix assignment is then used with the integrals to yield the mole fraction of each triad. The matrix calculation is a linear least squares implementation of Randall's (Journal of Macromolecular Chemistry and Physics, Reviews in Macromolecular Chemistry and Physics, C29 (2&3), 201-317, 1989) method modified to include the additional peaks and sequences for the 2.1 regio-error. Table B shows the integral regions and triad designations used in the assignment matrix. The numbers associated with each carbon indicate in which region of the spectrum it will resonate.

Mathematically the Matrix Method is a vector equation $s = fM$ where M is an assignment matrix, s is a spectrum row vector, and f is a mole fraction composition vector. Successful implementation of the Matrix Method requires that M, f, and s be defined such that the resulting equation is determined or over determined (equal or more independent equations than variables) and the solution to the equation contains the molecular information necessary to calculate the desired structural information. The first step in the Matrix Method is to determine the elements in the composition vector f. The elements of this vector should be molecular parameters selected to provide structural information about the system being studied. For copolymers, a reasonable set of parameters would be any odd n-ad distribution. Normally peaks from individual triads are reasonably well resolved and easy to assign, thus the triad distribution is the most often used in this composition vector f. The triads for the E/P copolymer are EEE, EEP, PEE, PEP, PPP, PPE, EPP, and EPE. For a polymer chain of reasonable high molecular weight (>=10,000 g/mol), the $^{13}$C NMR experiment cannot distinguish EEP from PEE or PPE from EPP. Since all Markovian E/P copolymers have the mole fraction of PEE and EPP equal to each other, the equality restriction was chosen for the implementation as well. The same treatment was carried out for PPE and EPP. The above two equality restrictions reduce the eight triads into six independent variables. For clarity reason, the composition vector f is still represented by all eight triads. The equality restrictions are implemented as internal restrictions when solving the matrix. The second step in the Matrix Method is to define the spectrum vector s. Usually the elements of this vector will be the well-defined integral regions in the spectrum. To insure a determined system the number of integrals needs to be as large as the number of independent variables. The third step is to determine the assignment matrix M. The matrix is constructed by finding the contribution of the carbons of the center monomer unit in each triad (column) towards each integral region (row). One needs to be consistent about the polymer propagation direction when deciding which carbons belong to the central unit. A useful property of this assignment matrix is that the sum of each row should equal to the number of carbons in the center unit of the triad which is the contributor of the row. This equality can be checked easily and thus prevents some common data entry errors.

After constructing the assignment matrix, a redundancy check needs to be performed. In other words, the number of linearly independent columns needs to be greater or equal to the number of independent variables in the product vector. If the matrix fails the redundancy test, then one needs to go back to the second step and repartition the integral regions and then redefine the assignment matrix until the redundancy check is passed.

In general, when the number of columns plus the number of additional restrictions or constraints is greater than the number of rows in the matrix M the system is overdetermined. The greater this difference is the more the system is overdetermined. The more overdetermined the system, the more the Matrix Method can correct for or identify inconsistent data which might arise from integration of low signal to noise (S/N) ratio data, or partial saturation of some resonances.

The final step is to solve the matrix. This is easily executed in Microsoft Excel by using the Solver function. The Solver works by first guessing a solution vector (molar ratios among different triads) and then iteratively guessing to minimize the sum of the differences between the calculated product vector and the input product vector s. The Solver also lets one input restrictions or constraints explicitly.

TABLE B

The Contribution of Each Carbon on the Central Unit of Each Triad Towards Different Integral Regions

| Triad Name | Structure | Region for 1 | Region for 2 | Region for 3 |
|---|---|---|---|---|
| PPP | (structure) | L | A | O |
| PPE | (structure) | J | C | O |
| EPP | (structure) | J | A | O |
| EPE | (structure) | H | C | O |
| EEEE | (structure) | K | K | |
| EEEP | (structure) | K | J | |
| EEP | (structure) | M | C | |
| PEE | (structure) | M | J | |
| PEP | (structure) | N | C | |
| PQE | (structure) | F | G | O |
| QEP | (structure) | F | F | |
| XPPQE | (structure) | J | F | O |

TABLE B-continued

The Contribution of Each Carbon on the Central Unit of Each Triad Towards Different Integral Regions

| Triad Name | Structure | Region for 1 | Region for 2 | Region for 3 |
|---|---|---|---|---|
| XPPQP | | J | E | O |
| PPQPX | | I | D | Q |
| PQPPX | | F | B | P |

P = propylene,
E = ethylene,
Q = 2,1 inserted propylene.

Chemical Shift Ranges

| A | B | C | D | E | F | G | H | I |
|---|---|---|---|---|---|---|---|---|
| 48.00 | 43.80 | 39.00 | 37.25 | 35.80 | 35.00 | 34.00 | 33.60 | 32.90 |
| 45.60 | 43.40 | 37.30 | 36.95 | 35.40 | 34.50 | 33.60 | 33.00 | 32.50 |

| J | K | L | M | N | O | P | Q |
|---|---|---|---|---|---|---|---|
| 31.30 | 30.20 | 29.30 | 27.60 | 25.00 | 22.00 | 16.00 | 15.00 |
| 30.30 | 29.80 | 28.20 | 27.10 | 24.50 | 19.50 | 15.00 | 14.00 |

1.2 inserted propylene composition is calculated by summing all of the stereoregular propylene centered triad sequence mole fractions. 2.1 inserted propylene composition (Q) is calculated by summing all of the Q centered triad sequence mole fractions. The mole percent is calculated by multiplying the mole fraction by 100. C2 composition is determined by subtracting the P and Q mole percentage values from 100.

Example 2

Metallocene Catalyzed

This example demonstrates calculation of composition values for propylene-ethylene copolymer made using a metallocene catalyst synthesized according to Example 15 of U.S. Pat. No. 5,616,664. The propylene-ethylene copolymer is manufactured according to Example 1 of US Patent Application 2003/0204017. The propylene-ethylene copolymer is analyzed as follows. The data is collected using a Varian UNITY Plus 400 MHz NMR spectrometer corresponding to a $^{13}$C resonance frequency of 100.4 MHz. Acquisition parameters are selected to ensure quantitative $^{13}$C data acquisition in the presence of the relaxation agent. The data is acquired using gated 1H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150 C with periodic refluxing initiated by heat gun.

Following data collection, the chemical shifts are internally referenced to the mmmm pentad at 21.90 ppm.

For metallocene propylene/ethylene copolymers, the following procedure is used to calculate the percent ethylene in the polymer using the Integral Regions assignments identified in the Journal of Macromolecular Chemistry and Physics, "Reviews in Macromolecular Chemistry and Physics," C29 (2&3), 201-317, (1989).

TABLE 2-A

Integral Regions for Calculating % Ethylene

| Region Designation | Chemical Shift Range/ppm | Integral Area |
|---|---|---|
| A | 44-49 | 259.7 |
| B | 36-39 | 73.8 |
| C | 32.8-34 | 7.72 |
| P | 31.0-30.8 | 64.78 |
| Q | Peak at 30.4 | 4.58 |
| R | Peak at 30 | 4.4 |
| F | 28.0-29.7 | 233.1 |
| G | 26-28.3 | 15.25 |
| H | 24-26 | 27.99 |
| I | 18-23 | 303.1 |

Region D is calculated as follows: D = P − (G − Q)/2.
Region E is calculated as follows: E = R + Q + (G − Q)/2.

The triads are calculated as follows:

TABLE 2-B

Triad Calculation

PPP = (F + A − 0.5D)/2
PPE = D
EPE = C
EEE = (E − 0.5G)/2
PEE = G
PEP = H
Moles P = (B + 2A)/2
Moles E = (E + G + 0.5B + H)/2

As discussed above, the block interpolymers comprise hard segments and soft segments. The soft segments can be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent. Conversely, the hard segments can be present in a similar range as above. The soft segment weight percentage (and thus the hard segment weight percentage) can be measured by NMR.

As demonstrated above, embodiments of the invention provide a new class of ethylene and α-olefin block interpolymers. The block interpolymers are characterized by an average block index of greater than zero, preferably greater than 0.2. Due to the block structures, the block interpolymers have a unique combination of properties or characteristics not seen for other ethylene/α-olefin copolymers. Moreover, the block interpolymers comprise various fractions with different block indices. The distribution of such block indices has an impact on the overall physical properties of the block interpolymers. It is possible to change the distribution of the block indices by adjusting the polymerization conditions, thereby affording the abilities to tailor the desired polymers. Such block interpolymers have many end-use applications. For example, the block interpolymers can be used to make polymer blends, fibers, films, molded articles, lubricants, base oils, etc. Other advantages and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

The invention claimed is:

1. A composition comprising at least one butene/α-olefin interpolymer comprising two or more substantially homogeneous intramolecular blocks comprising differing chemical or physical properties and having a difference in mole percent α-olefin content, said intramolecular blocks characterized by possessing a most probable molecular weight distribution, wherein the ethylene/α-olefin block interpolymer is characterized by a molecular weight distribution, $M_w/M_n$, in the range of from about 1.4 to about 2.8 and by an average block index greater than zero and up to about 1.0; and, wherein the butene/α-olefin block interpolymer is mesophase separated; and, wherein the block interpolymer has a molecular weight of from 10,000 g/mole to 300,000 g/mole, the difference in mole percent α-olefin content between the blocks is greater than 8.6 and a smallest domain size dimension of from 40 nm to 300 nm.

2. The butene/α-olefin block interpolymer of claim 1, wherein the blocks have a PDI in the range of from about 1.4 to about 2.8.

3. The butene/α-olefin block interpolymer of claim 1, wherein the value for χN, where N is the number average block length, is in the range of from about 2 to about 20.

4. The butene/α-olefin block interpolymer of claim 1, wherein the α-olefin is styrene, ethylene, 1-hexene, 1-octene, 4-methyl-1-pentene, norbornene, 1-decene, 1,5-hexadiene, or a combination thereof.

5. The butene/α-olefin block interpolymer of claim 1 wherein the difference in mole percent α-olefin content between the soft block and the hard block, Δ(percent comonomer), is calculated according to the following equation:

$$\Delta(\text{percent comonomer}) \geq A/(Mn)^{0.5}$$

wherein Mn is the number average molecular weight of all molecules in units of g/mole; and, wherein when octene is the comonomer, A is greater than or equal to about 12950, when propylene is the comonomer, A is greater than or equal to about 28600; and when ethylene is the comonomer, A is greater than or equal to about 6953.

6. The butene/α-olefin block copolymer of claim 1 wherein the α-olefin is octene and delta comonomer is greater than or equal to about 16.1 mole percent.

7. The butene/α-olefin block copolymer of claim 1 wherein the α-olefin is ethylene and delta comonomer is greater than or equal to about 8.6 mole percent.

8. The butene/α-olefin block copolymer of claim 1 wherein the α-olefin is propylene and delta comonomer is greater than or equal to about 35.6 mole percent.

9. The butene/α-olefin block interpolymer of claim 1 wherein the butene/α-olefin block copolymer has been compression molded.

10. The butene/α-olefin block interpolymer of claim 1 wherein the butene/α-olefin block interpolymer has an average block index greater than 0 but less than about 0.4 and a molecular weight distribution, $M_w/M_n$, greater than about 1.4.

11. The butene/α-olefin block interpolymer of any of claim 1, wherein the average block index is in the range from about 0.1 to about 0.3.

12. The butene/α-olefin block interpolymer of any of claim 1, wherein the average block index is in the range from about 0.4 to about 1.0.

13. The butene/α-olefin block interpolymer of any of claim 1, wherein the average block index is in the range from about 0.3 to about 0.7.

14. The butene/α-olefin block interpolymer of any of claim 1, wherein the average block index is in the range from about 0.6 to about 0.9.

15. The butene/α-olefin block interpolymer of any of claim 1, wherein the average block index is in the range from about 0.5 to about 0.7.

16. The butene/α-olefin block interpolymer of claim 1, wherein the interpolymer has a density in the range from about 0.86 g/cc to about 0.91 g/cc.

17. The butene/α-olefin interpolymer of claim 1, wherein the butene/α-olefin interpolymer is characterized by at least one melting point, Tm, in degrees Celsius, and a comonomer content, in weight %, wherein the numerical values of Tm and α-olefin correspond to the relationship:

$$T_m > -2.909(\text{wt }\% \text{ } \alpha\text{-olefin}) + 141.57.$$

18. The butene/α-olefin block interpolymer of claim 1 characterized by having at least one fraction obtained by Temperature Rising Elution Fractionation ("TREF"), wherein the fraction has a block index greater than about 0.3 and up to about 1.0.

19. The butene/α-olefin block interpolymer of claim 1, wherein the butene content is greater than about 50 mole percent.

20. The butene/α-olefin block interpolymer of claim 1, wherein the intramolecular blocks comprise hard segments and soft segments wherein the hard segments are present in an amount from about 5% to about 85% by weight of the interpolymer.

21. The butene/α-olefin block interpolymer of claim 20, wherein the hard segments comprise at least 90% of butene on a molar basis.

22. The butene/α-olefin block interpolymer of claim 20, wherein the soft segments comprise less than 90% of butene on a molar basis.

23. The butene/α-olefin block interpolymer of claim 20, wherein the soft segments comprise less than 70% of butene on a molar basis.

24. The butene/α-olefin block interpolymer of claim 1, wherein the block copolymer displays a reflection spectrum that reaches a value of at least 10 percent within the region of infrared, visible or ultraviolet light.

25. The butene/α-olefin block interpolymer of claim 1, wherein the block copolymer is pearlescent.

26. An article comprising the block interpolymer of claim 1.

27. The article of claim 26 wherein the article comprises a film, a molded article, jewelry, a toy, an optical article, a decorative article or a combination thereof.

28. A process for the polymerization of butene and one or more addition polymerizable monomers to form a block copolymer comprising two regions or segments of differentiated polymer composition or properties, said process comprising:

1) contacting an addition polymerizable monomer or mixture of monomers under addition polymerization conditions in a reactor or reactor zone with a composition comprising at least one olefin polymerization catalyst and a cocatalyst and characterized by the formation of polymer chains from said monomer or monomers;

2) transferring the reaction mixture to a second reactor or reactor zone and optionally adding one or more additional reactants, catalysts, monomers or other compounds prior to, commensurate with, or after said transfer; and 3) causing polymerization to occur in said second reactor or reactor zone to form polymer chains that are differentiated from the polymer chains formed in step 1);

said process being characterized by addition of a chain shuttling agent to the reaction mixture prior to, during, or subsequent to step 1) such that at least some of the resulting polymer molecules from step 3) comprise two or more chemically or physically distinguishable blocks or segments, wherein the block copolymer is mesophase separated; and, wherein the block interpolymer has a molecular weight of from 10,000 g/mole to 300,000 g/mole, the difference in mole percent α-olefin content between the blocks is greater than 8.7 and a smallest domain size dimension of from 40 nm to 300 nm.

* * * * *